United States Patent
Ide

(10) Patent No.: US 7,593,631 B2
(45) Date of Patent: Sep. 22, 2009

(54) CAMERA HAVING FOCUSING DEVICE

(75) Inventor: Masataka Ide, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 414 days.

(21) Appl. No.: 11/448,639

(22) Filed: Jun. 7, 2006

(65) Prior Publication Data

US 2006/0285842 A1 Dec. 21, 2006

(30) Foreign Application Priority Data

Jun. 21, 2005 (JP) ............................ 2005-180917

(51) Int. Cl.
G03B 13/22 (2006.01)
(52) U.S. Cl. ..................................... 396/93
(58) Field of Classification Search .................. 396/70, 396/77, 80, 93, 133; 359/626
See application file for complete search history.

(56) References Cited

U.S. PATENT DOCUMENTS

| | | | | |
|---|---|---|---|---|
| 4,473,286 A | * | 9/1984 | Watanabe et al. | ........... 396/133 |
| 5,138,356 A | * | 8/1992 | Nakamura et al. | ............. 396/95 |
| 5,144,355 A | * | 9/1992 | Hamada et al. | ............. 396/130 |
| 5,249,012 A | * | 9/1993 | Taniguchi et al. | ............. 396/81 |
| 2005/0225740 A1 | * | 10/2005 | Padlyar et al. | ................ 355/67 |
| 2006/0050409 A1 | * | 3/2006 | George et al. | ............... 359/708 |

FOREIGN PATENT DOCUMENTS

JP 09-211649 8/1997

* cited by examiner

*Primary Examiner*—Christopher E Mahoney
*Assistant Examiner*—Autumn Parker
(74) *Attorney, Agent, or Firm*—Straub and Pokotylo; John C. Pokotylo

(57) ABSTRACT

In a camera having a focusing device, the direction of moving a focus lens included in a photographing lens is varied depending on the defocus state with reference to a specific position (e.g., reverse point) of the focus lens. For example, a camera having a defocus-amount detection part for detecting the defocus amount of the photographing lens, a focus-lens position detecting part for detecting the position of the focus lens, and a memory element for storing a specific position of the focus lens, comprises a focus-lens moving mechanism for moving the focus lens by inverting the correspondence between the defocus direction output from the defocus-amount detection part and the focus-lens moving direction according to the output of the focus-lens position detecting part and the output of the memory element.

4 Claims, 16 Drawing Sheets

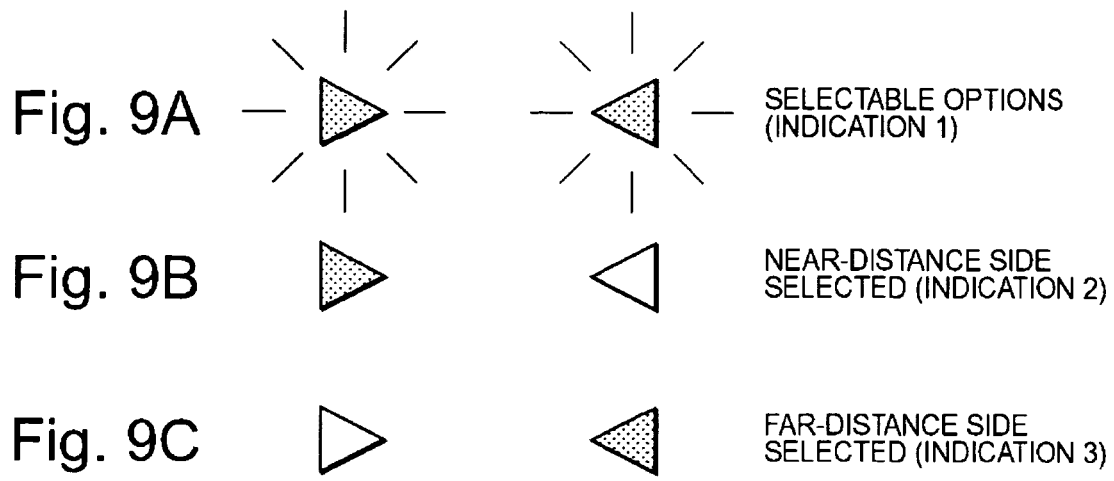
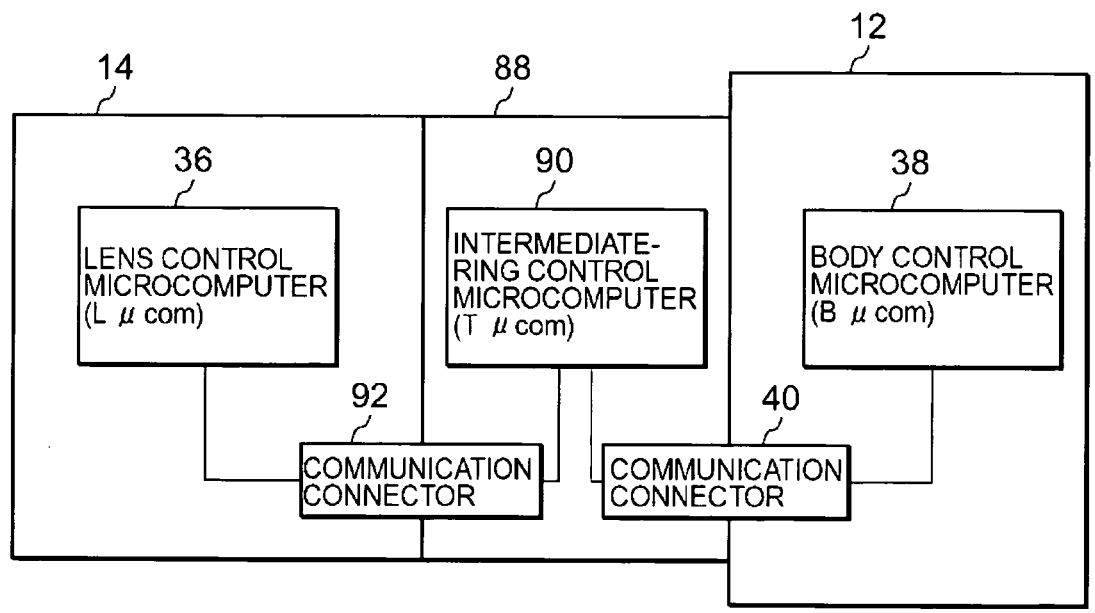
Fig. 10

| TYPE OF INTERMEDIATE RING | REVERSE-POINT POSITION DATA IN PHOTOGRAPHING LENS |
|---|---|
| 1 | DL1 |
| 2 | DL2 |
| 3 | DL3 |
| 4 | DL4 |
| ... | ... |
| n | DLn |

| TYPE OF PHOTOGRAPHING LENS | REVERSE-POINT POSITION DATA IN INTERMEDIATE RING |
|---|---|
| 1 | DT1 |
| 2 | DT2 |
| 3 | DT3 |
| 4 | DT4 |
| ... | ... |
| n | DTn |

CAMERA HAVING FOCUSING DEVICE

CROSS-REFERENCE TO RELATED APPLICATION

This application is based upon and claims the benefit of priority from prior Japanese Patent Application No. 2005-180917, filed on Jun. 21, 2005, the entire contents of which are incorporated herein by reference.

BACKGROUND OF THE INVENTION

1. Field of the Invention

The present invention relates to a lens-interchangeable camera (e.g., a system single-lens reflex (SLR) camera), and more particularly to a camera having a focusing device.

2. Description of the Related Art

A focusing device of a lens-interchangeable system SLR camera is disclosed, for example, in Japanese Patent Laid-Open No. 09-211649.

The focusing device of the lens-interchangeable system SLR camera disclosed in Japanese Patent Laid-Open No. 09-211649 enables autofocus (hereinafter abbreviated as "AF") on near subjects to do macro photography.

Among various modes of macro photography, there is a mode for taking life-size pictures of subjects, which is called 1× or 1:1 macro photography. It is known that the following phenomenon occurs in 1:1 macro photography.

For example, when a focus lens is extended from its in-focus position, the defocus amount of the lens with respect to the same subject usually varies in a negative (front-focus) direction, but in a macro range around 1:1, it varies in a positive (rear-focus) direction.

Because of such a phenomenon, the use of AF for 1:1 macro photography involves the following problem.

FIG. 17A is a curve chart showing, as an example, the relationship between the amount of extending a focus lens in a photographing lens system and its defocus amount around the 1:1 macro range. FIG. 17B is a curve chart showing the relationship between the amount of extending the focus lens and the photographic magnification. Note that the photographic magnification in FIG. 17B takes negative values and it means that an image formed on the imaging plane through the optical system is an inverted image of a real subject.

As shown in FIG. 17A, when the focus lens is extended from in-focus point A at which the defocus amount is 0, the defocus amount varies in the negative direction.

However, the defocus amount reaches a peak at point B, and after that, the defocus direction is changed to the positive direction. Then, at point C, the focus lens comes to a focus again at a photographic magnification (of 1×) different from that at point A.

Since this phenomenon occurs, AF is disabled between point B and point C, making the camera very difficult to use.

Conversely, if AF is performed when the focus lens is at point C, a photographer looking into a viewfinder will feel uncomfortable about such an AF operation that the finder image is changed from the first focused state (at point C) to a blur state around point B, and to a focused state again at point A at a magnification different from that at point C.

There has been no proposal yet for devices such as cameras that can improve the above-mentioned difficult-to-use problem.

BRIEF SUMMARY OF THE INVENTION

The camera having a focusing device of the present invention is to vary the moving direction of a focus lens included in a photographing lens according to its defocus state with reference to a specific position of the focus lens. This enables focusing easier to use.

For example, if point B in FIG. 17A is used as the specific position, such focusing control as to reflect the relationship between the amount of extending the focus lens in the photographing lens and the defocus amount in or near the 1:1 macro region is possible.

According to one aspect of the present invention, there is provided a camera having a focusing device comprising: a photographing lens including a focus lens to form an optical image of a subject; a defocus-amount detection part for detecting the defocus amount of the photographing lens; a focus-lens position detecting part for detecting the position of the focus lens; a memory element for storing a specific position of the focus lens; and a focus-lens moving mechanism for moving the focus lens by inverting the correspondence between the defocus direction output from the defocus-amount detection part and the focus-lens moving direction according to the output of the focus-lens position detecting part and the output of the memory element.

A detection part can be used instead of the memory element or together with the memory element. The detection part not only causes the focus-lens moving mechanism to move the focus lens in a predetermined direction, but also detects the position of the focus lens when the defocus-amount varying direction output from the defocus-amount detection part shows a predetermined direction.

According to another aspect of the present invention, there is provided a camera having a focusing device comprising: a photographing lens including a focus lens to form an optical image of a subject; a defocus-amount detection part for detecting the defocus amount of the photographing lens; a focus-lens position detecting part for detecting the position of the focus lens; a determination part for determining from the detection result of the focus-lens position detecting part whether the focus lens is located in a positional region where it has two or more in-focus points; a specific-position detection part for detecting a specific position of the focus lens; a selection part for selecting one of the in-focus points based on the detection result of the specific-position detection part when the determination part determines that the focus lens is located in a positional region where it has two or more in-focus points; and a drive mechanism for driving the focus lens to the in-focus point selected by the selection part.

In this case, the following structural elements can be provided instead of the selection part and the drive mechanism, namely: a display part for causing a display to allow a photographer to select one of the in-focus points based on the detection result of the specific-position detection part when the determination part determines that the focus lens is located in a positional region where it has two or more in-focus points, and a drive mechanism for driving the focus lens to the in-focus point selected by the photographer.

Further, a memory element prestoring the specific position can be provided instead of the specific-position detection part.

According to the present invention, when a lens-interchangeable camera (e.g., a system single-lens reflex (SLR) camera) is used, there can be provided a camera having a focusing device capable of providing improved, easy-to-use focusing in macro photography for taking pictures of near subjects.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 9A shows indication 1, meaning that both of the two in-focus points are selectable;

FIG. 9B shows indication 2, meaning that the near-distance side is selected from the two in-focus points;

FIG. 9C shows indication 3, meaning that the far-distance side is selected from the two in-focus points;

FIG. 10 is a schematic block diagram for explaining the features of a camera having a focusing device according to a third embodiment of the present invention;

DETAILED DESCRIPTION OF THE PREFERRED EMBODIMENT

Preferred embodiments of the invention are described below with reference to the accompanying drawings.

First Embodiment

Figure 1:
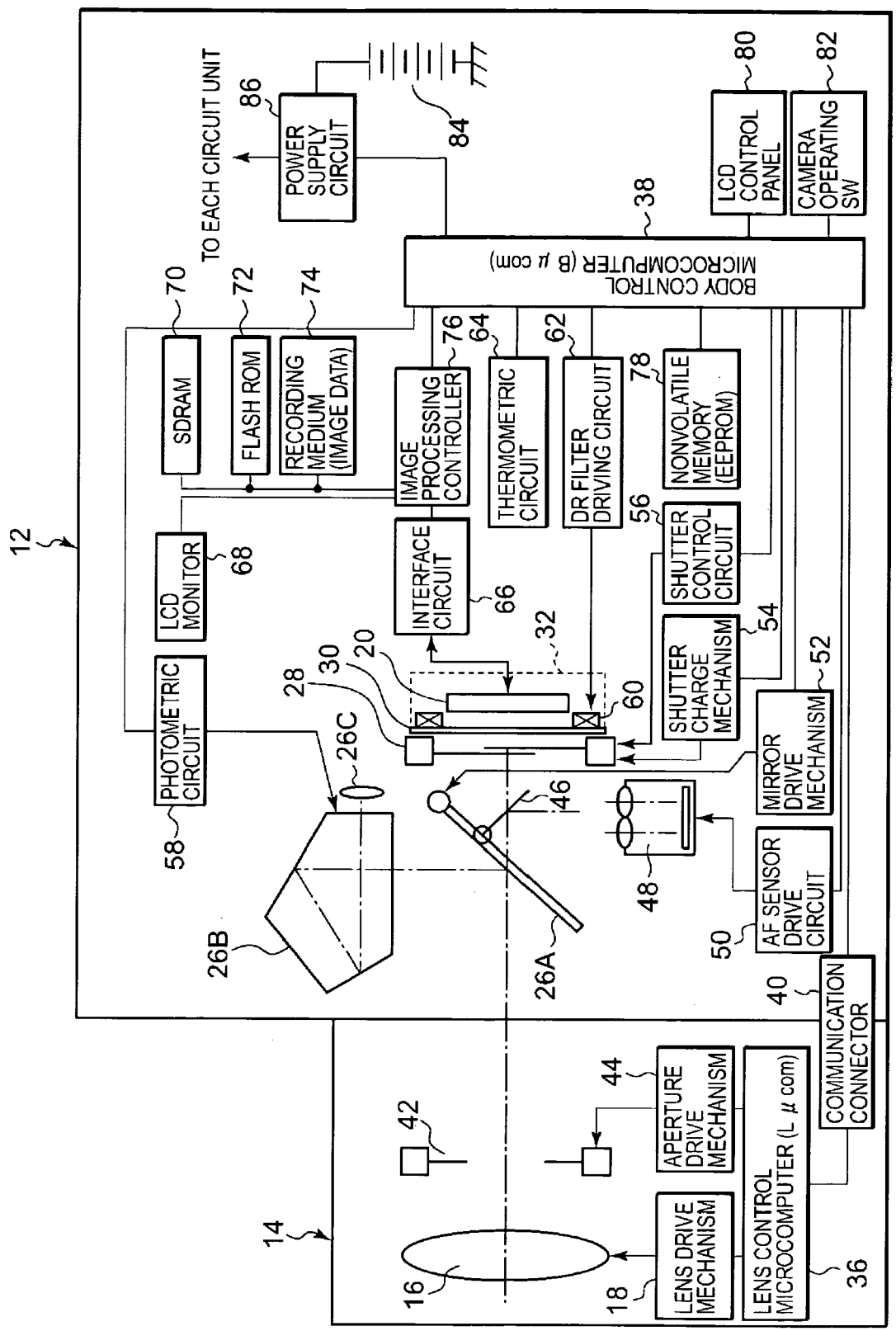
FIG. 1 is a block diagram showing the system structure of a digital camera as a camera having a focusing device according to a first embodiment of the present invention.
Figure 2:
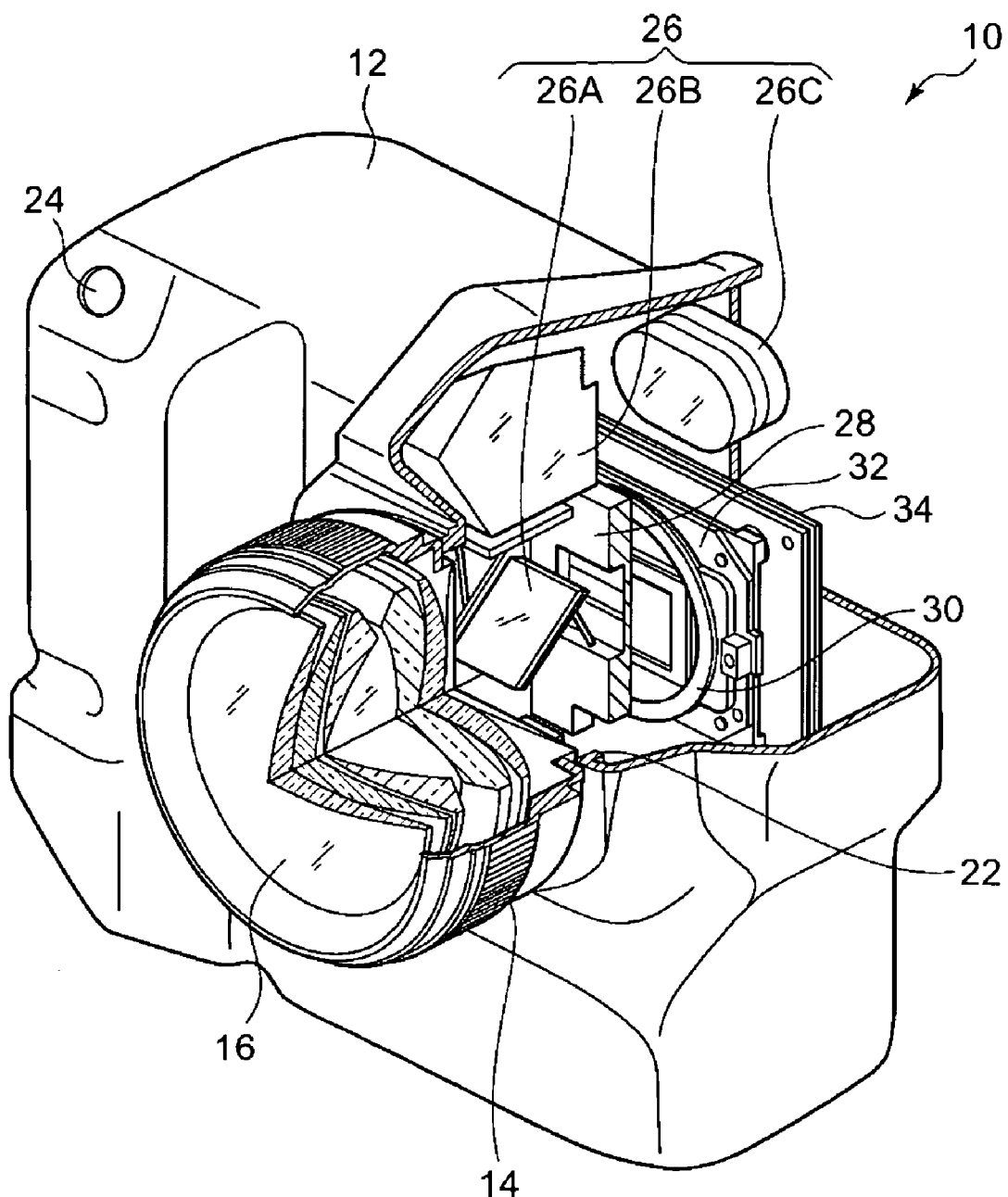
FIG. 2 is a perspective view showing the structure of the camera according to the first embodiment of the present invention, in which the camera body is partially cut away to give a schematic view of the internal structure of the camera.

FIG. 1 is a block diagram showing the system structure of a digital camera (hereinafter simply called the "camera") 10 as a camera having a focusing device according to a first embodiment of the present invention. FIG. 2 is a perspective view showing the structure of the camera 10, in which the camera body is partially cut away to give a schematic view of the internal structure of the camera 10.

The camera 10 consists principally of a camera body 12 and a lens barrel 14 as an interchangeable lens provided separately from each other. The camera body 12 and the lens barrel 14 are removable from each other.

The lens barrel 14 incorporates a photographing optical system 16 consisting of a plurality of lenses including a focus lens, a lens drive mechanism 18, etc. The photographing optical system 16 is configured to pass a light flux from a subject so that an image of the subject will be formed from the light flux of the subject in a predetermined position (on a photoelectric conversion surface of an image pickup device 20). The lens barrel 14 is arranged to project from the front face of the camera body 12.

The camera body 12 is of a so-called single-lens reflex type, incorporating various structural components. The camera body 12 is also equipped with a photographing optical system-mounting part 22 as a connecting member to allow the lens barrel 14 incorporating the photographing optical system 16 to be removably mounted on the camera body 12. In other words, an exposure opening having a predetermined diameter is formed almost in the central portion on the front side of the camera body 12 to guide the light flux of the subject to the inside of the camera body 12, and the photographing optical system-mounting part 22 is formed around the circumference of the exposure opening. To be more specific, the photographing optical system-mounting part 22 is provided on the front face of the exterior of the camera body 12.

Further, various operation members for operating the camera body 12, such as a shutter button 24 for generating a signal to instruct the start of shooting operation, are provided in position on the top face and back face of the camera body 12.

Inside the camera body 12, various structural components, such as a finder device 26, a shutter part 28, an imaging unit 32, and a plurality of circuit boards including a main circuit board 34 (only the main circuit board 34 is shown in FIG. 2), are arranged in position, respectively. The finder device 26 constitutes a finder optical system. The shutter part 28 includes a shutter mechanism and the like for controlling the irradiation time of the light flux of the subject onto the photoelectric conversion surface of the image pickup device 20. The imaging unit 32 includes the image pickup device 20 from which image signals corresponding to the subject image are obtained, and a dust reduction filter (also called a dust reduction glass) 30 as a dust reduction element, placed in position in front of the photoelectric conversion surface of the image pickup device 20 to prevent dust and the like from adhering to the photoelectric conversion surface. The main circuit board 34 has electric components constituting electric circuitry mounted on it.

The finder device 26 includes a reflecting mirror 26A, a pentaprism 26B, and an eyepiece lens 26C. The reflecting mirror 26A bends the light flux of the subject that passed through the photographing optical system 16 to guide it to the finder optical system. The pentaprism 26B receives the light flux from the reflecting mirror 26A to form an elect-unreversed image. The eyepiece lens 26C enlarges the image formed through the pentaprism 26B to a size and format best suited for viewing.

The reflecting mirror 26A is configured to be movable between a position retracted from the optical path of the photographing optical system 16 and a predetermined position in the optical path. During non-imaging time, the reflecting mirror 26A is located in the optical path of the photographing optical system 16, with a predetermined angle, for example, 45 degrees, tilted to the optical path. Therefore, when the camera 10 is in the non-imaging state, the light flux of the subject that passed through the photographing optical system 16 is bent and reflected by the reflecting mirror 26A toward the pentaprism 26B arranged above the reflecting mirror 26A. On the other hand, when the camera 10 performs the shooting operation, the reflecting mirror 26A is moved to the position retracted from the optical path of the photographing optical system 16, so that the light flux of the subject is guided to the side of the image pickup device 20.

The shutter part 28 can assume any type of structure commonly used for conventional cameras. For example, it can consist of a focal-plane type shutter mechanism, its drive circuit, etc.

The lens barrel 14 is controlled by a lens control microcomputer (hereinafter referred to as "L µcom") 36. The camera body 12 is controlled by a body control microcomputer (hereinafter referred to as "B µcom") 38. The L µcom 36 and the B µcom 38 are electrically connected through a communication connector 40 when the lens barrel 14 is mounted on the camera body 12 so that they can communicate with each other through the communication connector 40. In this case, the L µcom 36 cooperates dependently with the B µcom 38 to operate in the camera system.

As mentioned above, the photographing optical system 16 and the lens drive mechanism 18 are provided in the lens barrel 14. The photographing optical system 16 is driven by a DC motor, not shown, provided in the lens drive mechanism 18. An aperture 42 is also provided in the lens barrel 14. The aperture 42 is driven by a stepping motor, not shown, provided in an aperture drive mechanism 44.

L µcom 36 controls these motors in accordance with instructions from the B µcom 38.

On the other hand, in the camera body 12, a sub-mirror 46 and an AF sensor unit 48 are provided as structural components of the SLR camera in addition to the reflecting mirror 26A, the pentaprism 26B, and the eyepiece lens 26C. The AF sensor unit 48 receives a light flux reflected from the sub-mirror to perform automatic focusing.

An AF sensor drive circuit 50, a mirror drive mechanism 52, a shutter charge mechanism 54, a shutter control circuit 56, and a photometric circuit 58 are also provided in the camera body 12. The AF sensor drive circuit 50 controls the drive of the AF sensor unit 48. The mirror drive circuit 52 controls the drive of the reflecting mirror 26A. The shutter charge mechanism 54 charges the spring force to drive the front curtain and rear curtain of the shutter part 28. The shutter control circuit 56 controls the motion of the front curtain and the rear curtain. The photometric circuit 58 performs photometry based on the light flux from the pentaprism 26B.

On the optical path, the image pickup device 20 is provided for photoelectric conversion of the light flux that passed through the photographing optical system 16 to obtain a subject image. The image pickup device 20 is protected by the dust reduction filter 30, made of a transparent glass material and provided as an optical element between the photographing optical system 16 and the image pickup device 20.

A piezoelectric element 60 is attached around the circumference of the dust reduction filter 30 to vibrate the dust reduction filter 30 at a predetermined frequency. The piezoelectric element 60 has two electrodes and is driven by a dust-reduction (DR) filter driving circuit 62 to vibrate the dust reduction filter 30 so that dust adhering on the glass surface can be removed.

Further, a thermometric circuit 64 is provided near the dust reduction filter 30 to measure the ambient temperature around the image pickup device 20.

The camera 10 also includes an interface circuit 66 connected to the image pickup device 20, an LCD monitor 68, an SDRAM 70 provided as a storage area, and an image processing controller 76 for performing image processing using a flash ROM 72 and a recording medium 74, allowing the camera to provide an electronic recording/display function as well as an electronic imaging function.

Still another storage area for storing predetermined control parameters necessary for camera control, for example, a nonvolatile memory 78 such as an EEPROM, is provided accessibly from the B µcom 38.

An LCD control panel 80 for providing a display screen to a user to show the operating state of the camera, and a camera operating switch part (SW) 82 are connected to the B µcom 38. The camera operating switch part SW 82 is a group of switches including operation buttons necessary to operate the camera such as the shutter release switches, a mode change switch, a menu setting switch, a power switch, etc.

A battery 84 as a power source and a power supply circuit 86 for converting the voltage of the power source and supplying a voltage necessary for each circuit unit of the camera 10 are also provided in the camera 10.

The following describes the operation of the camera system configured mentioned above.

Each portion of the camera system is operated as follows.

First, the image processing controller 76 controls the interface circuit 66 in accordance with instructions from the B µcom 38 to acquire image data from the image pickup device 20. The image processing controller 76 converts the image data to a video signal and outputs it to the LCD monitor 68 so that the image of the image data will be displayed on the LCD monitor 68. Thus, the user can check the image shot on the LCD monitor 68.

The SDRAM 70 is a memory for temporary storage of image data and is used as a work area for image data conversion and the like. The image data is stored on the recording medium 74 after converted to JPEG data.

The image pickup device 20 is protected by the dust reduction filter 30 made of a transparent glass material as mentioned above. The piezoelectric element 60 is arranged around the circumference of the dust-reduction filter 30 to vibrate the glass surface. The piezoelectric element 60 is driven by the dust-reduction (DR) filter driving circuit 62. It is preferable for dust reduction purpose that the image pickup device 20 and the piezoelectric element 60 are housed integrally in a case, as shown by the broken line in FIG. 1, with the dust reduction filter 30 as its one face.

In general, temperature affects the elastic coefficient of a glass material. Since temperature is one factor that varies the natural frequency of the glass material, it is necessary to measure the temperature of the glass material in operation to allow for variations in natural frequency. It is therefore preferable to measure a change in the temperature of the dust reduction filter 30 provided to protect the front face of the image pickup device 20, which shows a sharp increase in temperature in operation, in order to estimate the natural frequency of the dust reduction filter 30. For this reason, a sensor (not shown) connected to the above-mentioned thermometric circuit 64 is provided in the camera 10 to measure the ambient temperature around the image pickup device 20. It is also preferably that the temperature measuring points of the sensor are placed near both poles of the vibrating surface of the dust reduction filter 30.

The mirror drive circuit 52 is a mechanism for driving the reflecting mirror 26A to move between UP and DOWN positions. When the reflecting mirror 26A is at the DOWN position, the light flux from the photographing optical system 16 is branched and guided to the AF sensor unit 48 and the pentaprism 26B, respectively.

The output of an AF sensor in the AF sensor unit 48 is sent to the B μcom 38 through the AF sensor drive circuit 50 to perform known photometry processing.

The user can view the subject through the eyepiece lens 26C provided near the pentaprism 26B. On the other hand, part of the light flux that passed through the pentaprism 26B is guided to a photosensor (not shown) in the photometric circuit 58 to perform known photometry processing based on the amount of light sensed by the photosensor.

Figure 3:
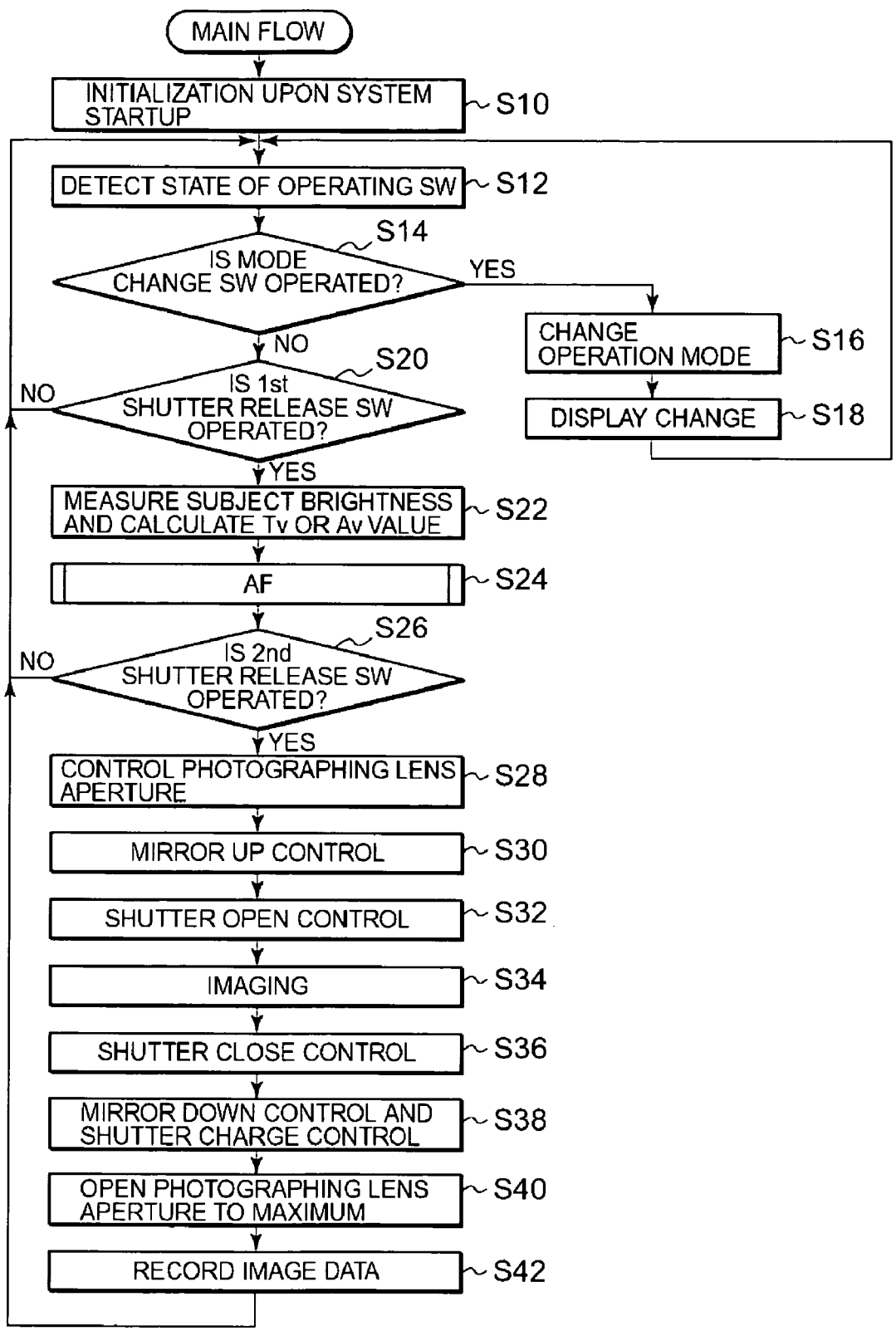
FIG. 3 is a flowchart showing the main flow executed by a B µcom in the camera according to the first embodiment of the present invention.

FIG. 3 is a flowchart showing the main flow executed by the B μcom 38 in the camera 10. When the camera 10 is powered on, the B μcom 38 starts the main flow.

First, initialization of the entire system is performed upon system startup of the camera 10 (step S10).

Then, the status of the camera operating SW 82 is detected (step S12). Here, it is determined whether a status change in the mode change SW (not shown), which is one of the camera operating SW 82, is detected in step S12 (step S14). If it is detected, the camera operation mode is changed in conjunction with the SW operated (step S16). Then, information on the changed operation mode is output to and displayed on the LCD control panel 80 (step S18), and the procedure returns to step S12.

Suppose here that an AF/MF switching SW (not shown) is operated to switch from the AF mode to an MF (manual focus) mode. In this case, the MF mode makes it possible for a photographer to manually operate the focus ring of the lens barrel 14 to focus on a subject. The display on the LCD control panel 80 is also switched from AF to MF.

On the other hand, if it is determined in step S14 that no status change in the mode change SW is detected, it is determined whether a 1st shutter release SW (not shown), which is also one of the camera operating SW 82, is turned on (step S20). The shutter button 24 is a two-step button, which turns on the 1st shutter release SW according to the first-step push-down and turns on a 2nd shutter release SW (not shown) according to the second-step push-down. Therefore, it is determined here whether the shutter button 24 is pushed down to the first-step position. If the 1st shutter release SW is not turned on, the procedure returns to step S12.

Once it is detected in step S20 that the 1st shutter release SW is turned on, the photometric circuit 58 measures the brightness of the subject to determine the necessity to fire an electronic flash and calculate Tv (shutter speed-priority AE) or Av (aperture-priority AE) value (step S22). Then, the AF sensor unit 48 is controlled to detect the amount of focus deviation, or the amount of defocus, and execute a sub-routine "AF" for focus drive control performed by the lens drive mechanism 18 of the lens barrel 14 based on the defocus amount (step S24). The details of the sub-routine "AF" will be described later.

After execution of the sub-routine "AF," it is then determined whether the 2nd shutter release SW, which is also one of the camera operating SW 82, is operated (step S26). If the 2nd shutter release SW is not operated, the procedure returns to step S12.

On the other hand, if the 2nd shutter release SW is turned on, the aperture drive mechanism 44 in the lens barrel 14 controls the aperture 42 (step S28). Then, the mirror drive circuit 52 performs mirror-up control to drive the quick return mirror (reflecting mirror 26A) to the UP position for shooting (step S30). Then, the shutter control circuit 56 controls the shutter part 28 to travel the front curtain and hence to open the shutter (step S32). Then, the image pickup device 20 is controlled to perform imaging (that is, to accumulate electric charges) (step S34).

After that, the rear curtain of the shutter part 28 is controlled to travel and hence to close the shutter (step S36). Then, the mirror drive circuit 52 performs mirror-down control to drive the quick return mirror (reflecting mirror 26A) to the shooting preparation position, and the shutter charge mechanism 54 performs shutter charge control (step S38). Further, control to open the aperture 42 of the lens barrel 14 to the maximum is performed (step S40).

After that, the image processing controller 76 records the acquired image data (step S42).

The main flow is ended after step S42, and the procedure returns to step S12 to repeat the above-mentioned sequence of operations.

Prior to describing the sub-routine "AF" executed in step S24, a method of converting a defocus amount detected in a macro region to a lens driving amount to perform AF will be described below.

Figure 4A:
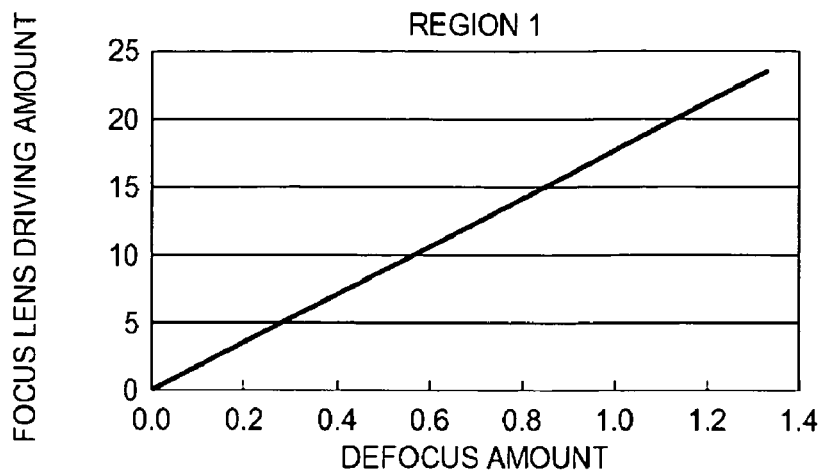
FIG. 4A is a graph showing the relationship between the defocus amount detected under the conditions of predetermined lens position and distance to a subject in a non-macro region (region 1) and the lens driving amount required to compensate for the defocus amount.
Figure 4B:
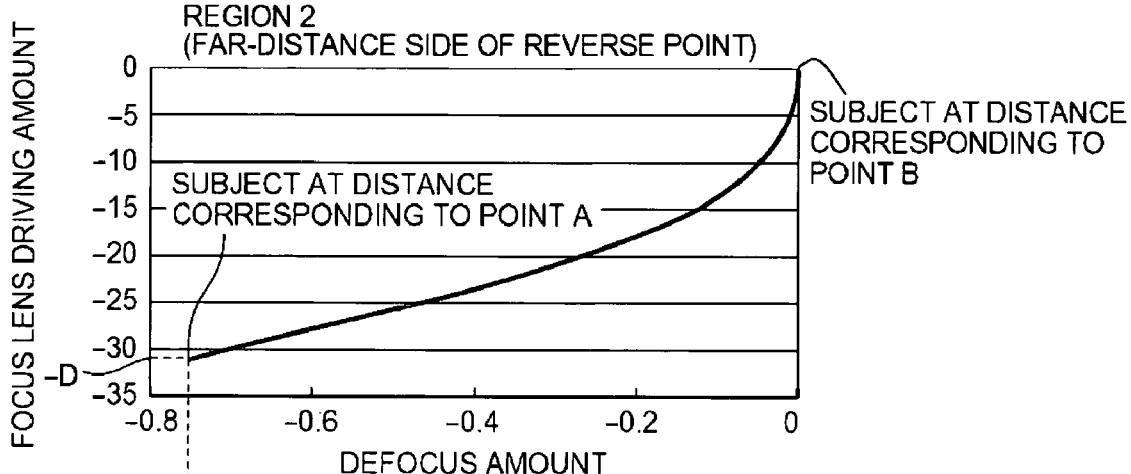
FIG. 4B is a graph showing the relationship between the defocus amount detected in a macro region (region 2) corresponding to the far-distance side of a reverse point and the lens driving amount required to compensate for the defocus amount.
Figure 4C:
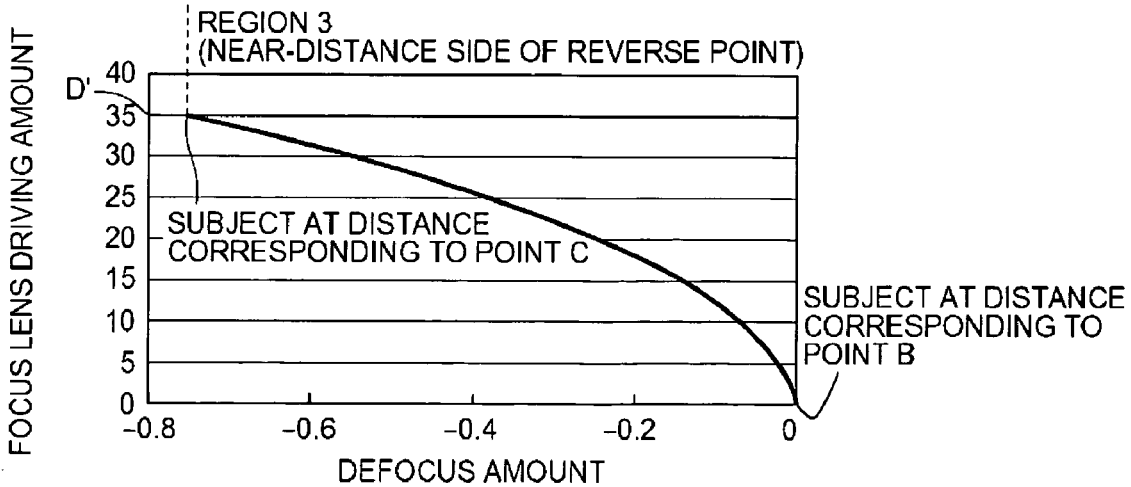
FIG. 4C is a graph showing the relationship between the defocus amount detected in another macro region (region 3) corresponding to the near-distance side of the reverse point and the lens driving amount required to compensate for the defocus amount.

FIGS. 4A to 4C show the relationship between the defocus amount detected and the lens driving amount required to compensate for the defocus amount and hence to focus the lens.

In the embodiment, the relationship between the defocus amount and the lens driving amount is considered, as an example, in the following three regions divided by characteristic difference: one non-macro region (region 1) and two macro regions (regions 2 and 3). In the macro regions, the region 2 is a macro region farther away than a point of reverse and the region 3 is a macro region closer than the point of reverse. The macro region closer than the point of reverse includes a 1:1 macro.

Figure 17A:
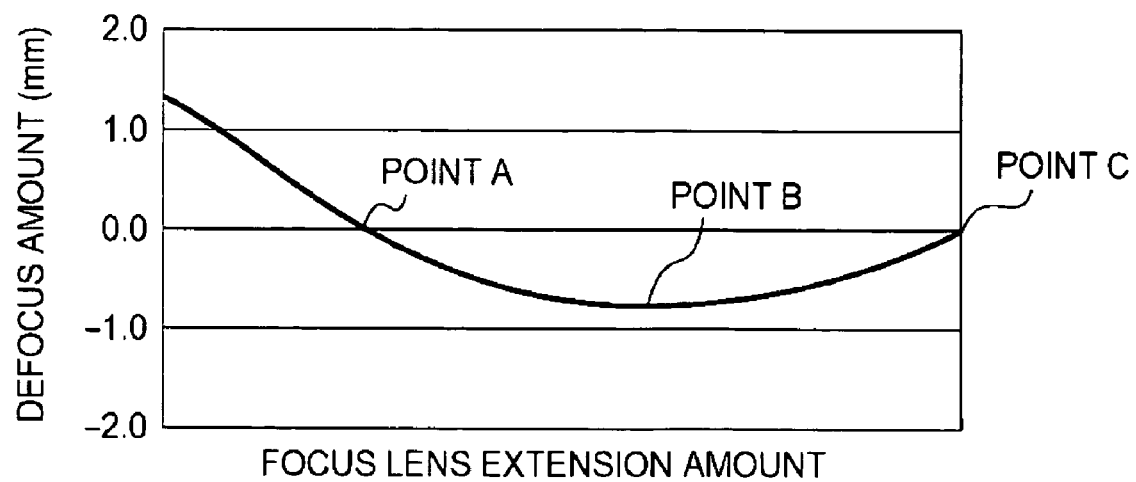
FIG. 17A is a graph showing the relationship between the amount of extending a focus lens in a photographing lens and the defocus amount around a 1:1 macro region.
Figure 17B:
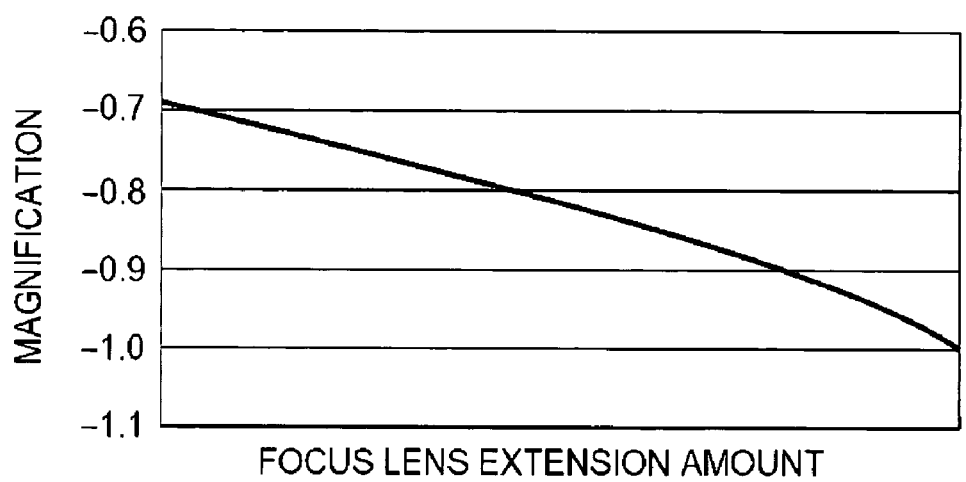
FIG. 17B is a graph showing the relationship between the amount of extending the focus lens and the photographic magnification.

For example, in FIG. 17A, when the defocus amount is detected while extending the focus lens from the position of the focus lens corresponding to point A, the defocus direction changes at point B in FIG. 17A from negative to positive. In the embodiment, such point B is called the "reverse point."

FIGS. 4A to 4C are graphs showing the relationship between the defocus amount detected under the conditions of predetermined lens position and distance to the subject and the lens driving amount required to compensate the defocus amount. It means that the lens can be focused by driving the focus lens by a lens driving amount corresponding to a defocus amount concerned in each graph.

FIG. 4A shows an example of characteristics when the focus lens is located in the non-macro region 1. It can be said from FIG. 4A that as the defocus amount increases in the positive (rear-focus) direction, the driving amount of the focus lens required to compensate for the defocus amount increases in the positive (lens-extending) direction.

FIGS. 4B and 4C show defocus amount-to-lens driving amount conversion characteristics under predetermined conditions.

FIG. 4B shows defocus amount-to-lens driving amount conversion characteristics (in region 2) when the focus lens is located at point B (reverse point) in FIG. 17A as a turning point between the regions 2 and 3 and the subject is at a distance between points B and A in FIG. 17A. For example, in FIG. 4B, if the focus lens is retracted by −D from point B as its current position, the lens can focus on the subject located at a distance corresponding to point A.

Note that, in the embodiment, the extending direction of the focus lens is represented as positive and the retracting direction of the focus lens is represented as negative.

Similarly, FIG. 4C shows defocus amount-to-lens driving amount conversion characteristics (in region 3) when the focus lens is located at point B (reverse point) in FIG. 17A as the turning point between the regions 2 and 3 and the subject is at a distance between point B and point C in FIG. 17A. In the region 3 (FIG. 4C), the plus or minus sign of the driving direction of the focus lens to focus the lens that is defocused by a defocus amount concerned in the graph is reversed from that in the normal (non-macro) operation. In other words, it is seen in the region 3 that the lens driving direction becomes positive (to extend the focus lens) in spite of the fact that the defocus direction is negative. For example, in FIG. 4C, if the focus lens is extended by D' from point B as its current position, the lens can focus on the subject located at a distance corresponding to point C.

Thus, suppose that the defocus amount of the focus lens that is located at the above-mentioned reverse point (that is, point B in FIG. 17A) is detected to determine a corresponding lens driving amount and hence to drive the focus lens by the lens driving amount determined. In this case, if the lens is driven (extended) according to the characteristic curve in the region 3, the subject located at a distance corresponding to point C can be focused at a magnification of 1:1.

On the other hand, if the lens is driven (retracted) according to the characteristic curve in the region 2, the subject located at a distance corresponding to point A can be focused at the magnification of 1:1.

As described above, a point different between the two macro regions is that the direction of driving the focus lens required to focus the lens on the subject is reversed even though the defocus amount from the subject at a distance in the region 2 (FIG. 4B) corresponding to point A in FIG. 17A and the defocus amount in the region 3 (FIG. 4C) corresponding to point C in FIG. 17A are the same as each other.

The absolute value of the lens driving amount is also different.

Although the above description is made, for convenience sake, of the case where the focus lens is located at point B as the reverse point, AF can be performed in the same manner regardless of the position of the focus lens in the entire macro region including the 1:1 macro.

In the embodiment, the method of converting the defocus amount to the lens driving amount using the characteristics in the region 1 is called defocus amount-to-lens driving amount conversion 1. Similarly, the methods of converting the defocus amount to the lens driving amount using the characteristics in the regions 2 and 3 are called defocus amount-to-lens driving amount conversion 2 and defocus amount-to-lens driving amount conversion 3, respectively.

When the focus lens is in the region 2, the defocus amount-to-lens driving amount conversion 2 is used to focus the lens at point A in FIG. 17A, while when the focus lens is in the region 3, the defocus amount-to-lens driving amount conversion 3 is used to focus the lens at point C in FIG. 17A.

Thus, such AF control as to drive the focus lens to an in-focus point smaller in the driving amount from the current position of the focus lens is performed.

Figure 5:
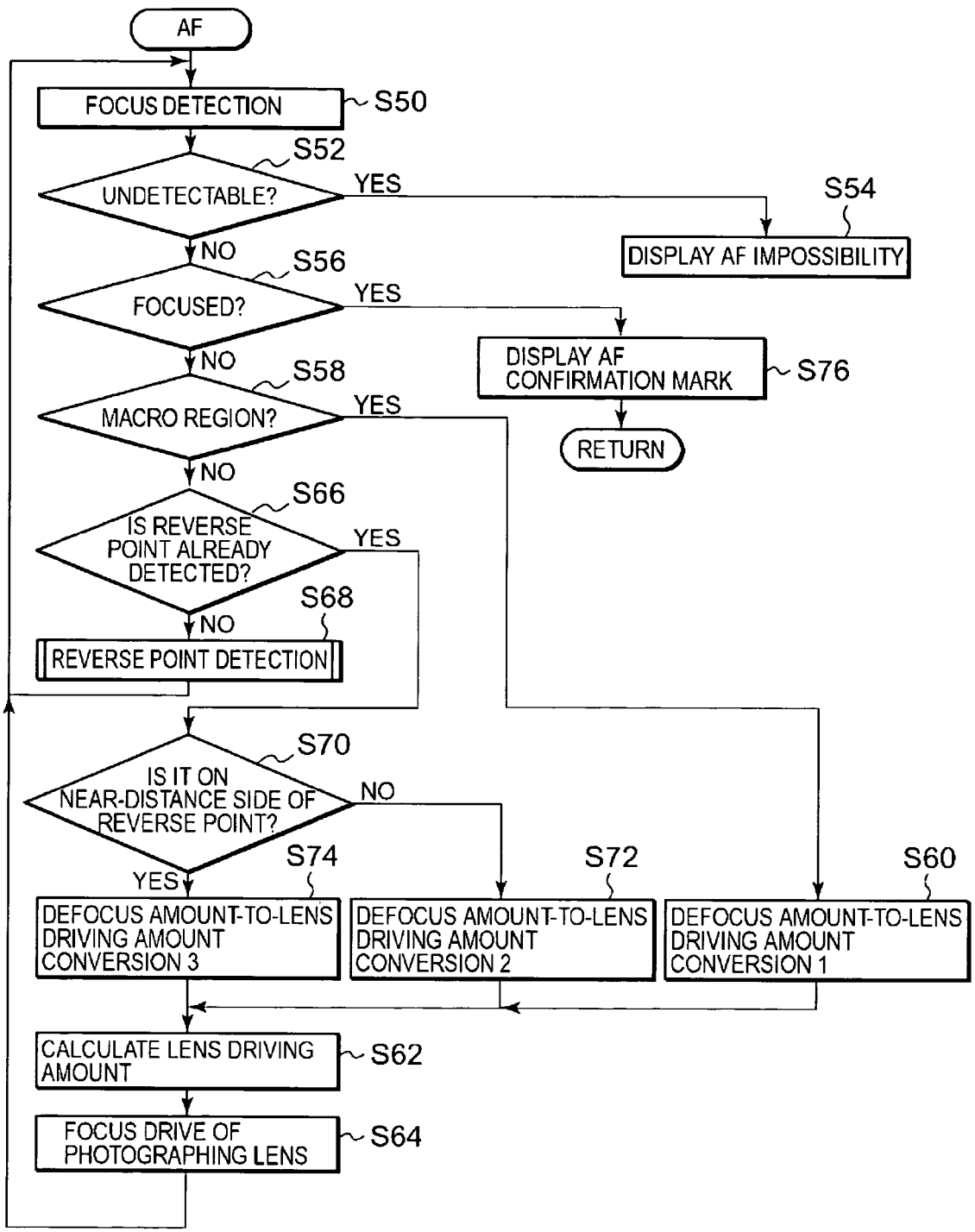
FIG. 5 is a flowchart showing the details of a sub-routine "AF" in FIG. 3.

FIG. 5 is a flowchart showing the details of the sub-routine "AF" executed in step S24.

In this sub-routine "AF," the AF sensor unit 48 is first controlled to perform focus detection to detect the defocus amount of the photographing optical system 16 (step S50).

It is then determined whether the focus is detectable or not (step S52). If it is not detectable, it is indicated through a finder display and the like that the focus is not detectable (step S54), and the sub-routine "AF" is ended.

On the other hand, if it is determined in step S52 that the focus is detectable, it is then determined whether the detection result shows that the lens is focused in a predetermined defocus range (step S56).

If it is determined that the lens is not focused, it is then determined whether the focus lens is located in a macro region (step S58). In this determination process, an encoder (not shown) included in the lens drive mechanism 18 of the lens barrel 14 reads the position of the focus lens to determine whether the focus lens is located in a macro region.

If the focus lens is not located in a macro region, the defocus amount-to-lens driving amount conversion 1 is selected (step S60). The defocus amount-to-lens driving amount conversion 1 is a method of converting the defocus amount to the lens driving amount in the non-macro region (region 1) where the focus lens is moved within a region other than the macro region. After that, based on the defocus amount determined as a result of foal point detection in step S50 and the defocus amount-to-lens driving amount conversion method selected, the lens driving amount is calculated (step S62) to drive the focus lens based on the lens driving amount calculated (step S64). Then, the procedure returns to step S50 to perform focus detection again and repeat the above-mentioned processing loop until the focus is determined to be undetectable or the lens is determined to be focused.

On the other hand, if it is determined in step S58 that the focus lens is located in a macro region (region 2 or 3), it is then determined whether the reverse point (point B in FIG. 17A) is already detected (step S66). If the reverse point is not detected yet, a sub-routine "Reverse Point Detection," the details of which will be described later, is executed to determine the reverse point (step S68). After that, the procedure returns to step S50.

If the reverse point is already detected, the detected reverse point is compared with the current position of the focus lens to determine whether the current position of the focus lens is on the near-distance side (region 3) of the reverse point (step S70). If it is not on the near-distance side, that is, if the focus lens is located in the region 2, the defocus amount-to-lens driving amount conversion 2 is selected (step S72). The defocus amount-to-lens driving amount conversion 2 is a method of converting the defocus amount to the lens driving amount in one macro region (region 2) where the focus lens is moved within a macro region that does not correspond to the near-distance side of the reverse point. On the other hand, if the focus lens is located on the near-distance side (region 3), the defocus amount-to-lens driving amount conversion 3 is selected (step S74). The defocus amount-to-lens driving amount conversion 3 is a method of converting the defocus amount to the lens driving amount in the other macro region (region 3) where the focus lens is moved within the macro region corresponding to the near-distance side of the reverse point.

When a defocus amount-to-lens driving amount conversion method is selected in the manner mentioned above, the procedure proceeds to step S62 to calculate the lens driving amount based on the defocus amount-to-lens driving amount conversion method selected and the defocus amount determined in step S50. Then, in step S64, the focus lens of the lens barrel 14 is driven based on the lens driving amount calculated.

The above-mentioned sequence of operations is repeated, and once it is determined in step S56 that the lens is focused, it is indicated through the finder display and the like that the lens is focused, that is, an AF confirmation mark is displayed (step S76), and the sub-routine "AF" is ended.

Figure 6:
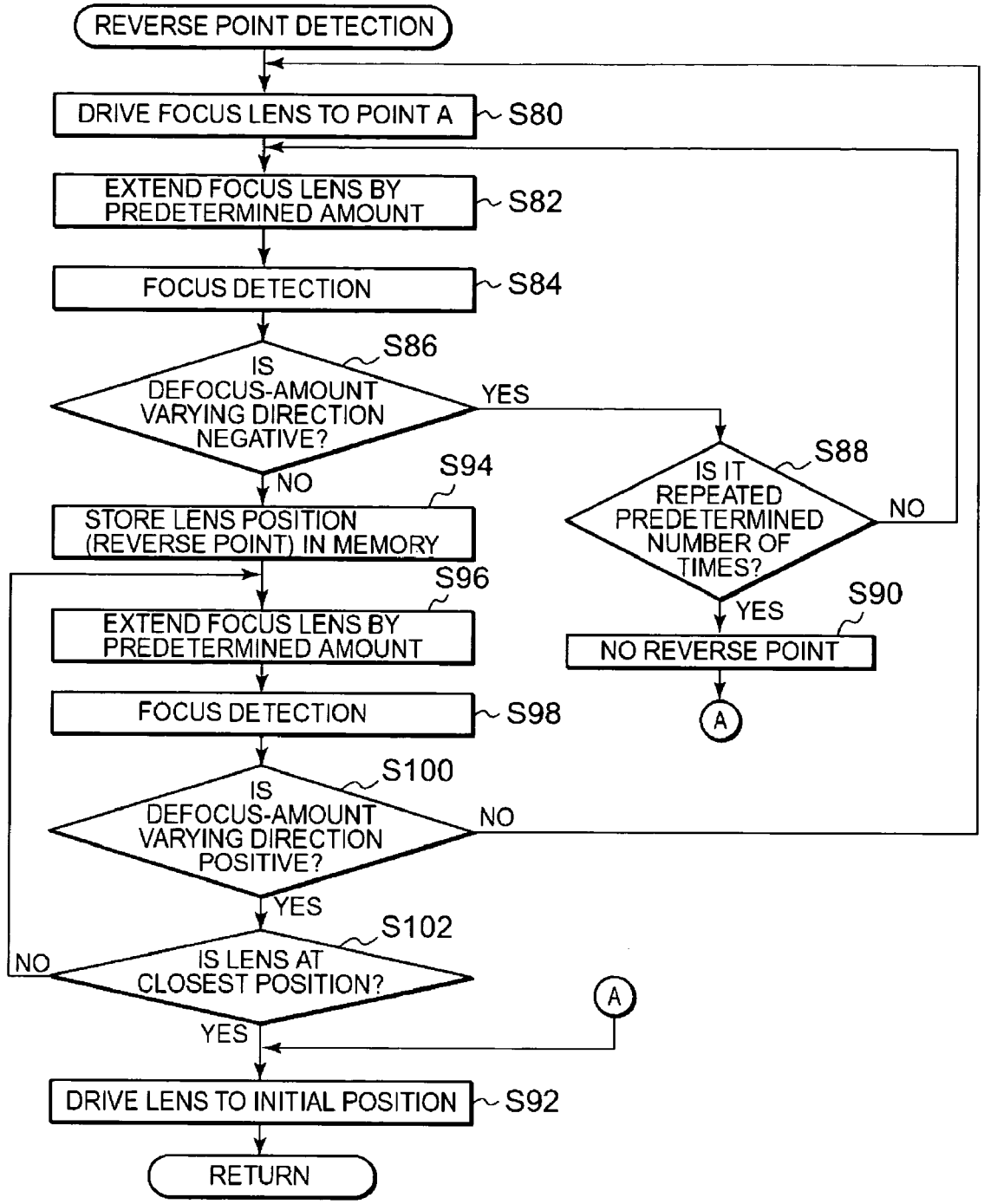
FIG. 6 is a flowchart showing the details of a sub-routine "Reverse Point Detection" in FIG. 5.

FIG. 6 is a flowchart showing the details of the sub-routine "Reverse Point Detection" executed in step S68.

In this sub-routine "Reverse Point Detection," the focus lens of the photographing optical system 16 is first driven, for example, to point A in FIG. 17A (step S80). In this case, the current position of the focus lens is stored as the initial position in a memory, not shown, in the B μcom 38, or in the SDRAM 70.

After that, the focus lens as part of the photographing optical system 16 in the lens barrel 14 as an interchangeable lens is extended by a predetermined amount (step S82). Then, the AF sensor unit 48 is controlled to perform focus detection to determine the defocus amount of the photographing optical system 16 (step S84).

The defocus amount determined is compared with the defocus amount in the previous position of the focus lens to determine whether the defocus-amount varying direction is negative or not (step S86).

If the defocus-amount varying direction is negative, the number of times the extension of the focus lens by the predetermined amount in step S82 and the focus detection in step S84 are repeated is counted to determine whether it reaches a predetermined number of times (step S88). If it does not reach the predetermined number of times, the procedure returns to step S82 to repeat the extension of the focus lens by the predetermined amount (step S82) and the focus detection (step S84). Then, once it reaches the predetermined number of times in step S88, a flag indicating the absence of the reverse point is set in the memory, not shown, in the B μcom 38, or in the SDRAM 70 (step S90). Further, the focus lens is returned to the initial position at which the focus lens was located before execution of this routine (step S92), and the sub-routine "Reverse Point Detection" is ended.

On the other hand, if it is determined in step S86 that the defocus-amount varying direction is not negative, the current position of the focus lens that is located at the reverse point (point B in FIG. 17A) is stored in the memory, not shown, in the B μcom 38 or in the SDRAM 70 (step S94).

After that, the focus lens is extended by a predetermined amount (step S96). Then, focus is detected to determine the defocus amount (step S98). The defocus amount determined is compared with the defocus amount in the previous lens position to determine whether the defocus-amount varying direction is positive or not (step S100).

If the defocus-amount varying direction is not positive, it is considered that a detection error has occurred, and the sub-routine "Reverse Point Detection" is executed again. To this end, the procedure returns to step S80 to return the focus lens to the initial position at which the focus lens was located before execution of the sub-routine.

On the other hand, if it is determined that the defocus-amount varying direction is positive, it is then determined whether the focus lens reaches the closest position (step S102). If it does not reach the closest position, the procedure returns to step S96 to repeat the extension of the focus lens (step S96) and the focus detection (step S98).

Then, once it is determined that the focus lens reaches the closest position, the procedure proceeds to step S92 to return the focus lens to the initial position as the lens position before execution of the sub-routine. After that, the sub-routine "Reverse Point Detection" is ended.

Thus, the position of the focus lens at point B in FIG. 17A as the reverse point can be determined.

Note that, although in the above-mentioned sub-routine "Reverse Point Detection" the defocus amount is detected while extending the focus lens to detect the transition of the defocus direction from negative to positive, the defocus amount can also be detected while retracting the focus lens to detect the transition of the defocus direction from positive to negative.

As described above, the first embodiment is to detect the position of the focus lens at point B as the reverse point at which the defocus amount and the lens moving direction required to compensate for the defocus amount are reversed to those in the normal case. Then, if the focus lens is located in a nearer range than point B, the method of converting the defocus amount to the lens driving amount is changed to a proper method, thereby enabling proper AF operation. This can improve usability without giving any uncomfortable feeling to the photographer.

Second Embodiment

In the first embodiment, an in-focus point is selected depending on the region in which the focus lens is located, while in the second embodiment, the photographer is allowed to select a in-focus point. Therefore, if the focus lens is located in an intermediate region in which two in-focus points exist, the photographer is informed of it on the display device and urged to select an in-focus point using an operation switch. Then, once an in-focus point is selected, AF is performed to drive the focus lens to the selected in-focus point. If no in-focus point is selected, the same processing as in the first embodiment is performed.

The concept of a focusing device according to this embodiment, a specific configuration of the camera 10 having the focusing device according to this embodiment, and the main flow executed by the B μcom 38 in the camera 10 are the same as those in the first embodiment with reference to FIGS. 1, 2, and 3, so that their repetitive description will be omitted.

Figure 7:
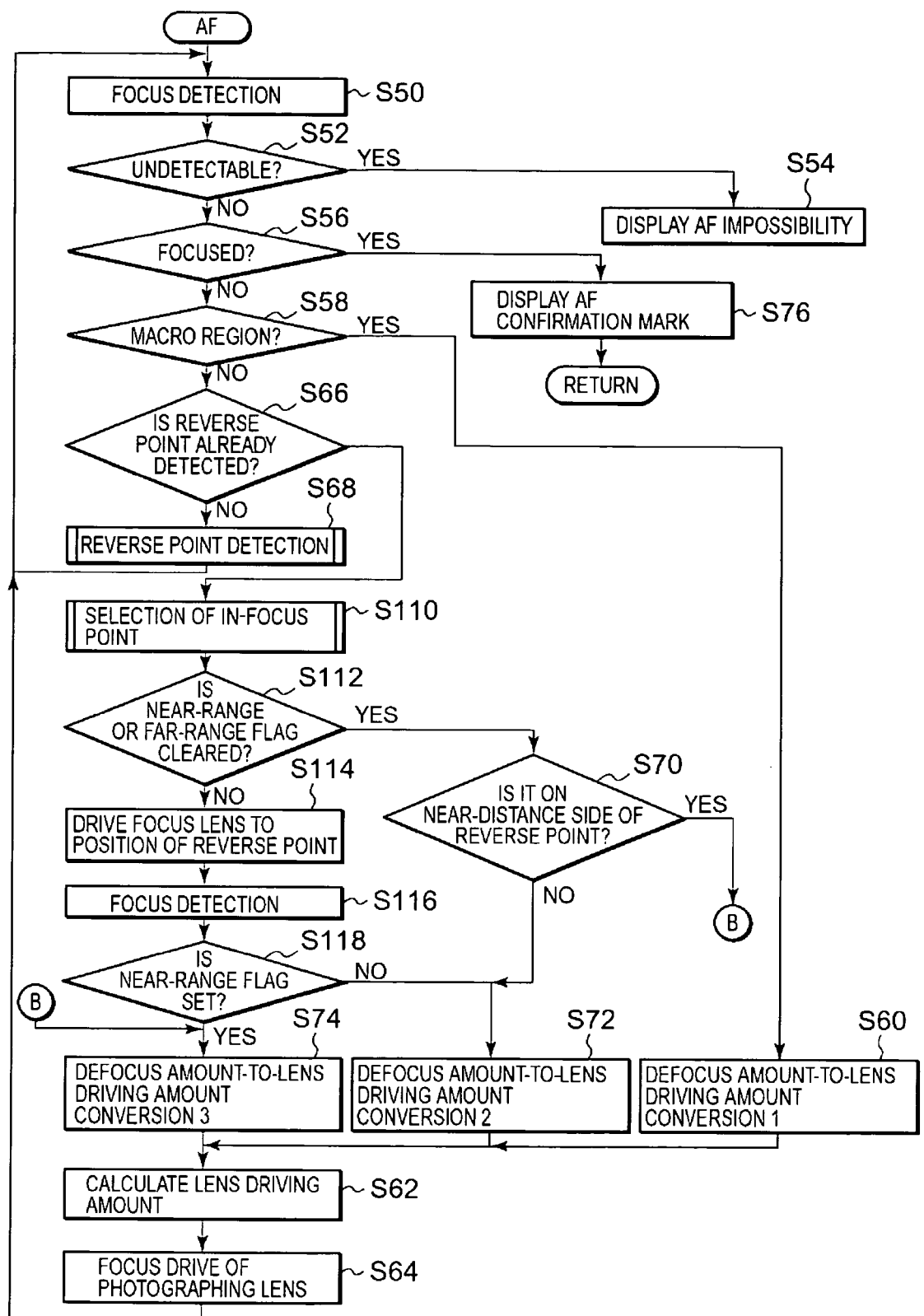
FIG. 7 is a flowchart showing the details of a sub-routine "AF" executed in a camera having a focusing device according to a second embodiment of the present invention.

FIG. 7 is a flowchart showing the details of a sub-routine "AF" executed in step S24 according to this embodiment. The following describes only the points different from those in the first embodiment, omitting the description of the common points.

In the embodiment, if it is determined in step S58 that the focus lens is not in a macro region, the defocus amount-to-lens driving amount conversion 1 is selected in step S60 in the same manner as in the first embodiment. Then, in step S62, the lens driving amount is calculated based on the defocus amount and the defocus amount-to-lens driving amount conversion method selected, and in step S64, the focus lens of the lens barrel 14 is driven based on the lens driving amount calculated.

On the other hand, if it is determined in step S58 that the focus lens is in a macro region, and in step S66 that the reverse point is already detected, a sub-routine "Selection of In-Focus Point," the details of which will be described later, is executed in this embodiment to set a near-range flag or far-range flag according to the photographer's choice of an in-focus point (step S110). It is then checked whether the near-range flag or far-range flag set in the sub-routine "Selection of In-Focus Point" is cleared or not (step S112). If both flags are cleared, since it means that the photographer did not select an in-focus point, a defocus amount-to-lens driving amount conversion method is selected automatically in the same manner as in the first embodiment. In other words, the procedure proceeds to step S70 as described in the first embodiment. Then, if the current position of the focus lens is not on the near-distance side of the reverse point, that is, if the focus lens is located in the region 2, the defocus amount-to-lens driving amount conversion 2 is selected in step S72. On the other hand, if it is on the near-distance side of the reverse point, that is, if the focus lens is located in the region 3, the defocus amount-to-lens driving amount conversion 3 is selected in step S74. Then, in step S62, the lens driving amount is calculated based on the defocus amount-to-lens driving amount conversion method selected and the defocus amount, and in step S64, the focus lens of the lens barrel 14 is driven based on the lens driving amount calculated.

On the other hand, if it is determined in step S112 that either the near-range flag or the far-range flag is set, the focus lens is driven to the reverse point (point B) (step S114) to perform focus detection (step S116). This is to detect a focus in the central portion of the macro region for the purpose of improving the accuracy of focus detection. It is then determined whether the near-range flag is set or not, that is, it is determined whether the photographer selects an in-focus point on the near-distance side (step S118). If the near-range flag is cleared, the procedure proceeds to step S72 to select the defocus amount-to-lens driving amount conversion 2, while if the near-range flag is set, the procedure proceeds to step S74 to select the defocus amount-to-lens driving amount conversion 3. Then, in step S62, the lens driving amount is calculated based on the defocus amount-to-lens driving amount conversion method selected and the defocus amount, and in step S64, the focus lens of the lens barrel 14 is driven based on the lens driving amount calculated.

Figure 8:
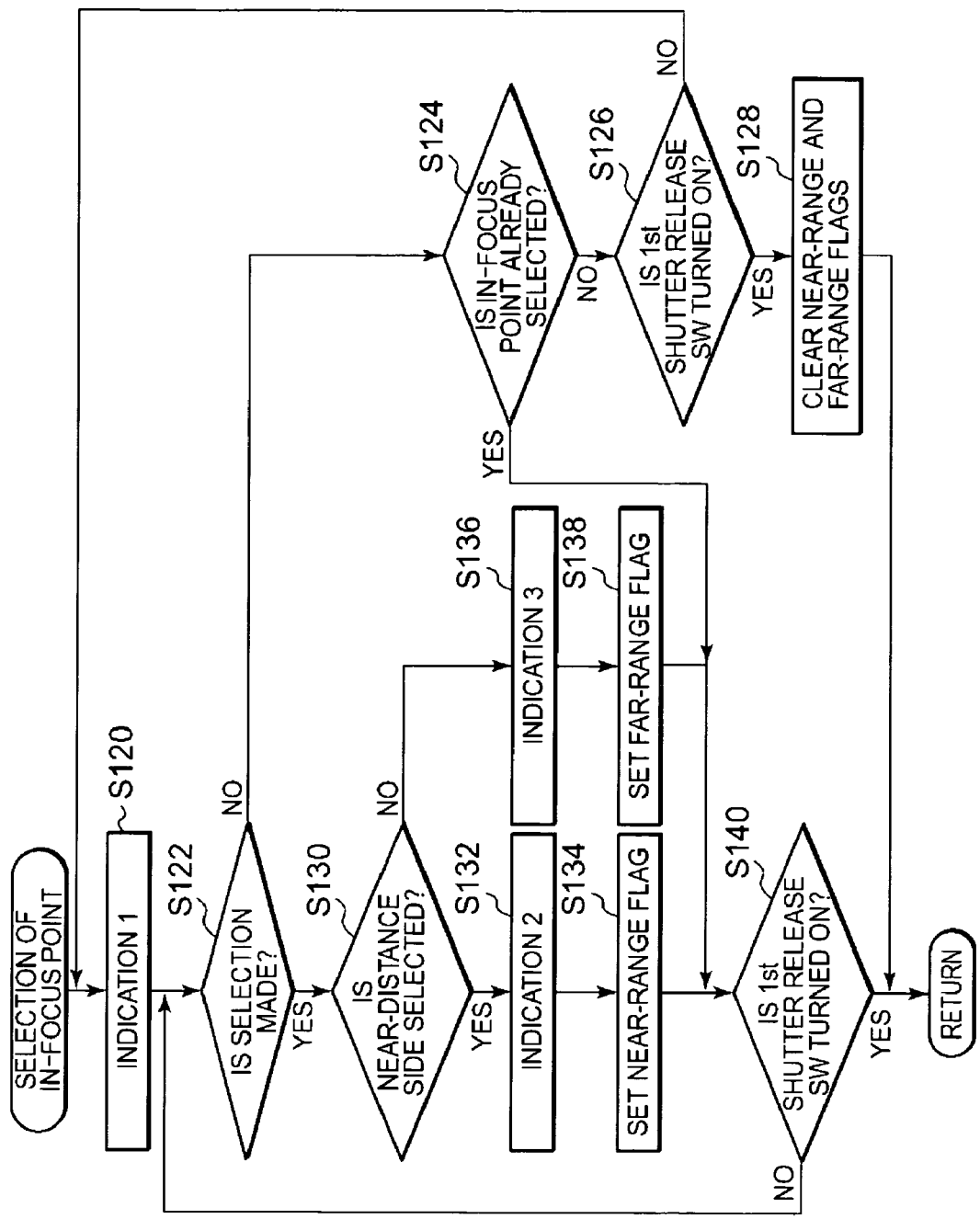
FIG. 8 is a flowchart showing the details of a sub-routine "Selection of In-Focus Point" in FIG. 7.

FIG. 8 is a flowchart showing the details of the sub-routine "Selection of In-Focus Point" executed in step S110. This processing step is to allow the photographer to select an in-focus point while viewing indications as shown in FIGS. 9A to 9C. If the photographer desires 1:1 macro shooting, he or she selects one in-focus point on the near-distance side, while if the photographer does not desire 1:1 macro shooting, he or she selects the other in-focus point on the far-distance side.

The indications shown in FIGS. 9A to 9C appear in the viewfinder, on the LCD control panel 80, and/or on the LCD monitor 68, using triangular marks indicating the rear focus and front focus, respectively, which is common as focus-aiding marks in the MF mode. Here, FIG. 9A shows indication 1, meaning that both of the two in-focus points are selectable, FIG. 9B shows indication 2, meaning that the near-distance side is selected from the two in-focus points. FIG. 9C shows indication 3, meaning that the far-distance side is selected from the two in-focus points.

In this sub-routine "Selection of In-Focus Point," the indication 1, meaning that either of the in-focus points is selectable as shown in FIG. 9A, is first displayed in the viewfinder and on the other display devices (step S120).

After that, it is determined whether the photographer selects an in-focus point with the operation of the camera operating SW 82 (step S122).

If the photographer does not select an in-focus point, it is then determined whether either of the in-focus points has already been selected (step S124). If no in-focus point has been selected, it is then determined whether the 1st shutter release SW is turned on (step S126). If it is not turned on, the procedure returns to step S120 to continue the selectable state. Then, once the 1st shutter release SW is turned on, the near-range flag and the far-range flag are cleared (step S128), and the sub-routine "Selection of In-Focus Point" is ended.

On the other hand, if it is determined in step S122 that the photographer selects an in-focus point, it is then determined whether the selected in-focus point is on the near-distance side or not (step S130). If it is on the near-distance side, the indication 2, meaning that the near-distance side is selected as shown in FIG. 9B, is displayed (step S132), and the near-range flag is set in the memory, not shown, in the B μcom 38 or in the SDRAM 70 (step S134). On the other hand, if the far-distance side is selected, the indication 3, meaning that the far-distance side is selected as shown in FIG. 9C, is displayed (step S136), and the far-range flag is set in the memory, not shown, in the B μcom 38 or in the SDRAM 70 (step S138).

After completion of setting the near-range flag or the far-range flag, or if it is determined in step S124 that the in-focus point has already been selected, it is then determined whether the 1st shutter release SW is turned on (step S140). If the 1st shutter release SW is not turned on, the procedure returns to step S120 to continue the selectable state.

Then, once the 1st shutter release SW is turned on, the sub-routine "Selection of In-Focus Point" is ended.

Thus, according to the second embodiment, the photographer can select either of the two in-focus points different in photographic magnification (distance) from each other. Then, the defocus amount is converted to the lens driving amount by a methbod suitable for the selected in-focus point to drive the focus lens, so that AF to fit the photographer's intention can be performed, thereby improving usability.

Note that a memory element presorting information relating to the reverse point can be provided instead of performing the above-mentioned reverse-point detection processing. The memory element may be provided on the side of the lens barrel 14 or the side of an intermediate ring as described in the following embodiment.

Third Embodiment

There is commonly known an accessory, called an intermediate ring (or close-up ring), which is inserted between the camera body 12 and the lens barrel 14 including the photographing optical system 16 to enable more close-up photography than the case where only the photographing optical system 16 is mounted.

Such an intermediate ring can be inserted between the camera body 12 and the photographing optical system 16 (lens barrel 14) to extend the back focus range and hence to shift the shootable range of the photographing optical system 16 to the near-distance side, enabling macro photography.

Further, if the type of photographing optical system 16 is of a macro type, 1:1 macro shooting is possible, but at the same time, the phenomenon described with reference to FIG. 17A also occurs.

The third embodiment is applicable when such an intermediate ring is used. Since the specific system structure of a camera 10 having a focus device according to this embodiment is basically the same as that in the first embodiment described with reference to FIG. 1, only the different portions will be described below.

In this embodiment, as shown in FIG. 10, an intermediate ring 88 is inserted between the camera body 12 and the lens barrel 14. The intermediate ring 88 incorporates an intermediate ring control microcomputer (hereinafter referred to as "T μcom") 90. It also has a communication connector 92 with the lens barrel 14 and a communication connector 40 with the camera body 12, so that T μcom 90 can communicate with the L μcom 36 and the B μcom 38 to exchange commands and data.

Figure 11:
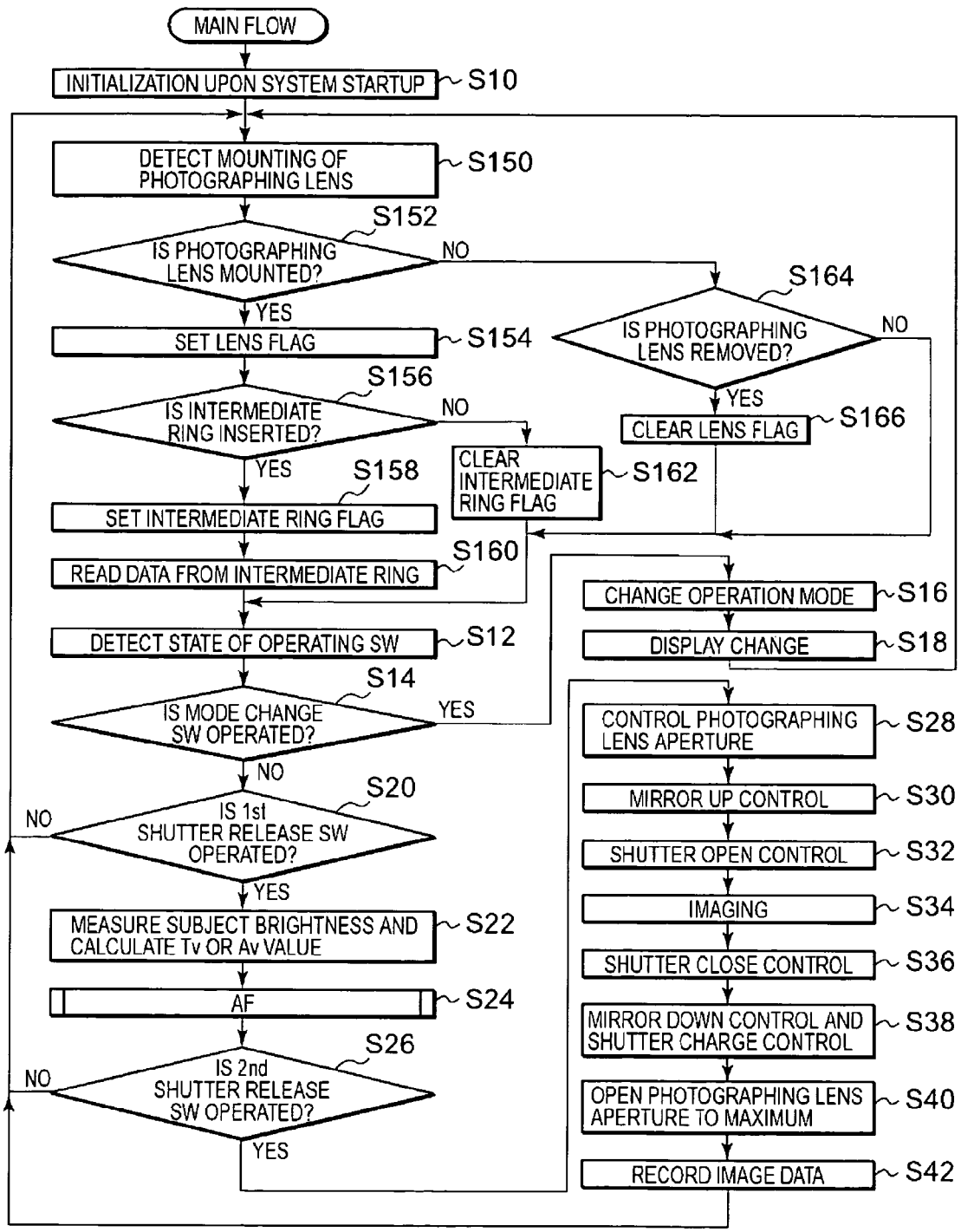
FIG. 11 is a flowchart showing the main flow executed by the B µcom in the camera having the focusing device according to the third embodiment of the present invention.

FIG. 11 is a flowchart showing the main flow executed by the B μcom 38 of the camera 10. When the camera 10 is powered on, the B μcom 38 starts the main flow.

First, initialization of the entire system is performed upon system startup of the camera 10 (step S10).

In the embodiment, mounting of the lens barrel 14 having the photographing optical system 16 (including the intermediate ring) on the camera body 12 is detected (step S150). It is then determined whether the lens barrel 14 (including the intermediate ring) is mounted or not (step S152).

If it is determined to be mounted, a lens flag is set in the memory, not shown, in the B μcom 38 or in the SDRAM 70 (step S154). Then, the B μcom 38 communicates with the lens barrel 14 to acquire necessary data. After that, it is determined whether the intermediate ring is mounted or not (step S156). If it is mounted, an intermediate ring flag is set in the memory, not shown, in the B μcom 38 or in the SDRAM 70 (step S158). Then, the B μcom 38 communicates with the intermediate ring to read data stored in a memory element (EEPROM or the like, not shown) in the intermediate ring (step S160). After that, the procedure proceeds to processing in step S12 as described in the first embodiment.

If it is determined in step S156 that no intermediate ring is mounted, the intermediate ring flag is cleared (step S162). After that, the procedure proceeds to processing in step S12 as described in the first embodiment.

If it is determined in step S152 that the lens barrel 14 (including the intermediate ring) is not mounted yet, it is then determined whether the lens barrel 14 having the photographing optical system 16 (including the intermediate ring) is demounted or not (step S164). If it is not demounted, the procedure proceeds to processing in step S12 as described in the first embodiment. On the other hand, if it is demounted, since the lens barrel 14 is not mounted on the camera body 12, the lens flag is cleared (step S166), and the procedure proceeds to processing in step S12 as described in the first embodiment.

The following processing steps S12 to S42 are basically the same as those in the first embodiment, except that the procedure returns to step S150 after steps S18 and S42, and when NO in steps S20 and S26, and that the content of the sub-routine "AF" executed in step S24 is different from that in the first embodiment. Therefore, the description of the common steps will be omitted.

Figure 12:
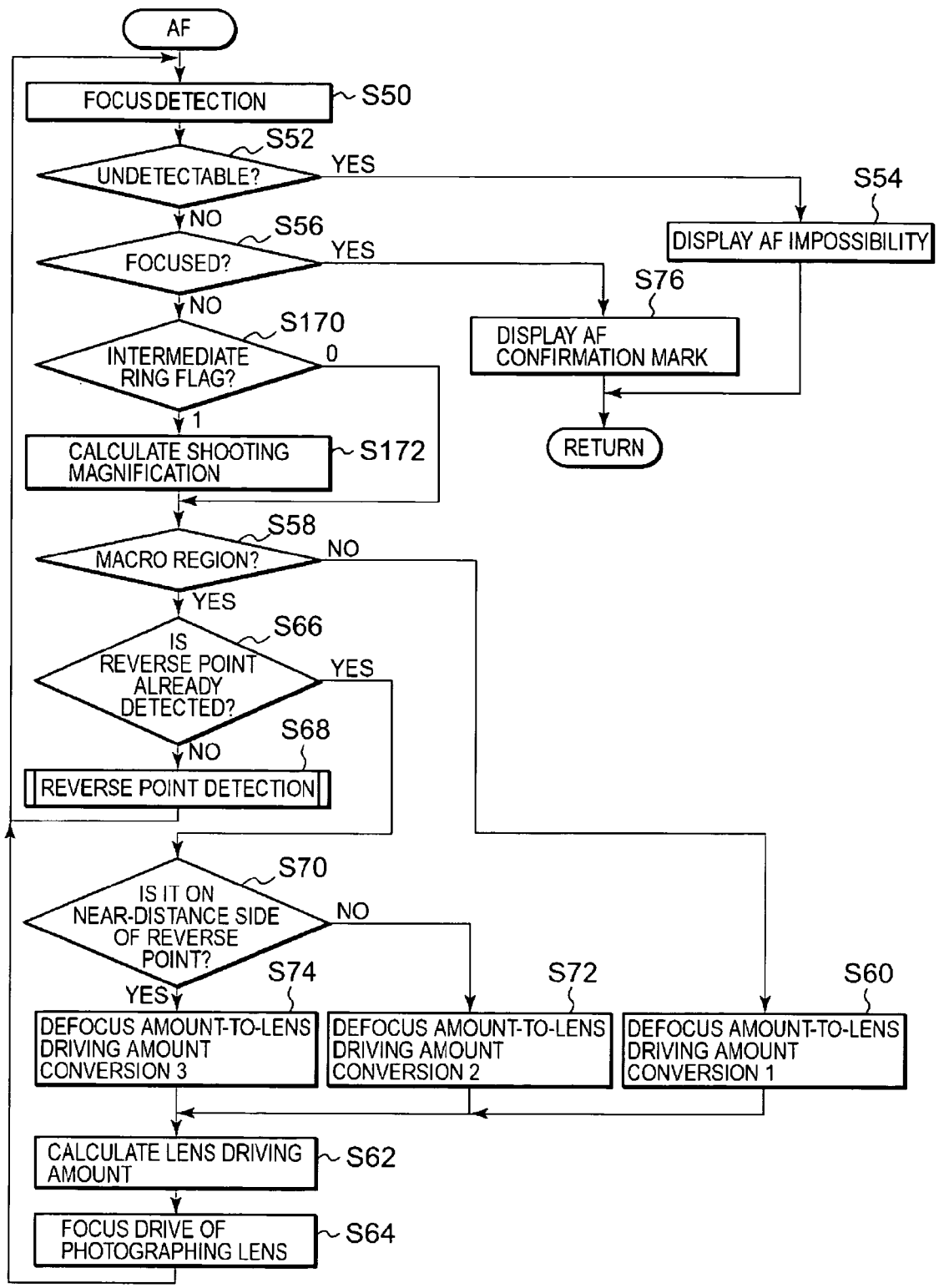
FIG. 12 is a flowchart showing the details of a sub-routine "AF" in FIG. 11.

FIG. 12 is a flowchart showing the details of the sub-routine "AF" executed in step S24 in the embodiment. The following describes only the points different from those in the first embodiment, omitting the description of the common points.

In the sub-routine "AF" in the embodiment, if it is determined in step S56 that the lens is not focused, the intermediate ring flag set in the main flow of FIG. 11 is referred to (step S170). If it is cleared, the procedure shifts to step S58.

On the other hand, if the intermediate ring flag is set, the photographic magnification is calculated (step S172) and the procedure proceeds to step S58. The magnification calculation is made based on the length of the ring varying depending on the type of intermediate ring and the position of the focus lens read by the encoder included in the lens drive mechanism 18 of the lens barrel 14.

Then, in step S58, it is determined from the photographic magnification whether the focus lens is in a macro region or not.

Thus, according to the third embodiment, even though the intermediate ring 88 is inserted to do macro photography or photography including the 1:1 macro, the focus lens position at point B as the reverse point, at which the defocus amount and the lens traveling direction required to compensate for the defocus amount are reversed to those in the normal case, can be detected around the 1:1 macro region. Then, if the focus lens is located in a nearer range than point B, the method of converting the defocus amount to the lens driving amount is changed to a proper method, thereby enabling proper AF operation. This can improve usability without giving any uncomfortable feeling to the photographer.

Fourth Embodiment

Figures 13A, 13B:
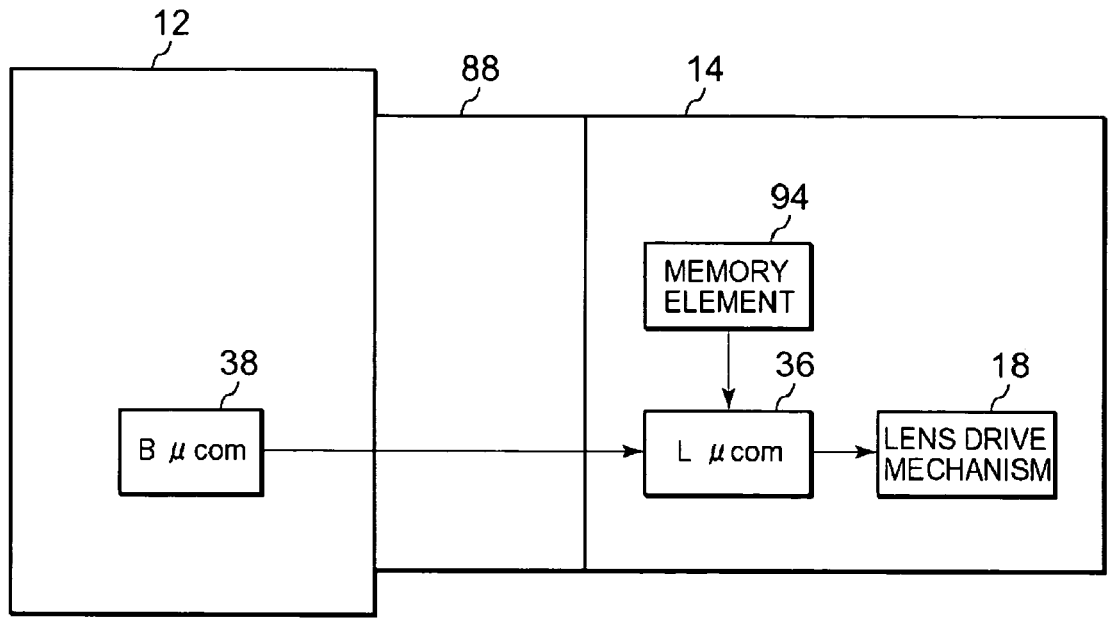
FIG. 13A is a schematic block diagram for explaining the features of a camera having a focusing device according to a fourth embodiment of the present invention.
FIG. 13B is a table showing an example of reverse-point position data stored in a memory element in a lens barrel.

A camera 10 having a focusing device according to the fourth embodiment uses an intermediate ring 88 like in the third embodiment. FIG. 13A is a schematic diagram of the fourth embodiment.

In this camera 10, the lens barrel 14 includes a memory element ((such as an EEPROM) 94 as storage means in addition to the L μcom 36 functioning as control means and the lens drive mechanism 18 functioning as focus lens moving means.

When the intermediate ring 88 and the lens barrel 14 are mounted on the camera body 12, the B μcom 38 in the camera body 12 communicates with the intermediate ring 88 to detect that the intermediate ring 88 is mounted on the camera body 12. The detection result of the B μcom 38 is output to the L μcom 36 in the lens barrel 14. The L μcom 36 acquires position information on reverse points relative to the types of intermediate rings prestored in the memory element 94. The reverse-point position data are electrically written to the memory element 94 at the time of manufacturing the lens barrel 14 (interchangeable photographing lens). During manufacturing, the reverse points can be measured and determined by a method as described in the first embodiment with reference to FIG. 6, and written to the memory element 94.

Then, the L μcom 36 compares the position information on the focus lens in the photographing optical system 16 with the position of a corresponding reverse point acquired from the memory element 94 to control the lens drive mechanism 18.

Specifically, when the focus lens is located on the near-distance side of point B as the reverse point, the method of converting the defocus amount to the lens driving amount is changed to a proper method to perform AF.

The other structural components of the camera body 12 and the lens barrel 14 are the same as those in the first embodiment (FIG. 1). Further, the main flow is the same as that in the third embodiment (FIG. 11). Therefore, the description of these common portions will be omitted.

Figure 14:
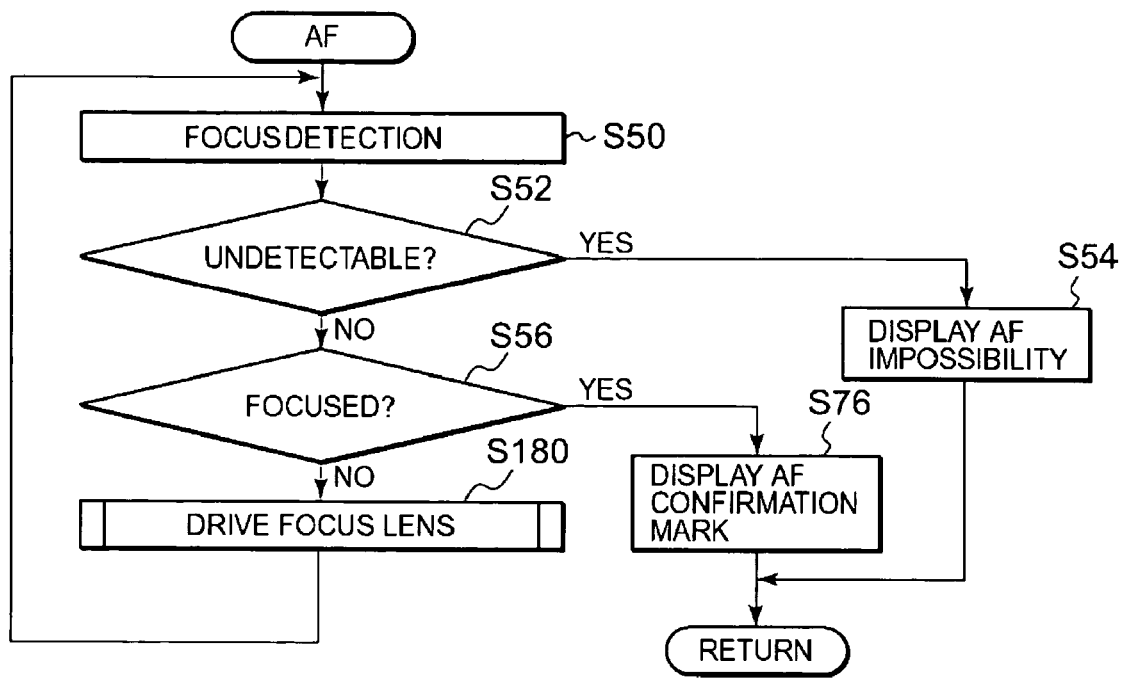
FIG. 14 is a flowchart showing the details of a sub-routine "AF" executed in the camera having the focusing device according to the fourth embodiment of the present invention.

FIG. 14 is a flowchart showing the details of the sub-routine "AF" executed by the B μcom 38 in step S24 according to this embodiment.

In the embodiment, the B μcom 38 first controls the AF sensor unit 48 to perform focus detection to detect the defocus amount of the photographing optical system in the lens barrel 14 (step S50). It is then determined whether the focus is detectable (step S52). If it is not detectable, it is indicated through the finder display and the like that the focus is not detectable (step S54), and the sub-routine "AF" is ended.

On the other hand, if it is determined in step S52 that the focus is detectable, it is then determined whether the detection result shows that the lens is focused in a predetermined defocus range (step S56). If it is determined that the lens is focused, it is indicated through the finder display and the like that the lens is focused, that is, an AF confirmation mark is displayed (step S76), and the sub-routine "AF" is ended.

Figure 15:
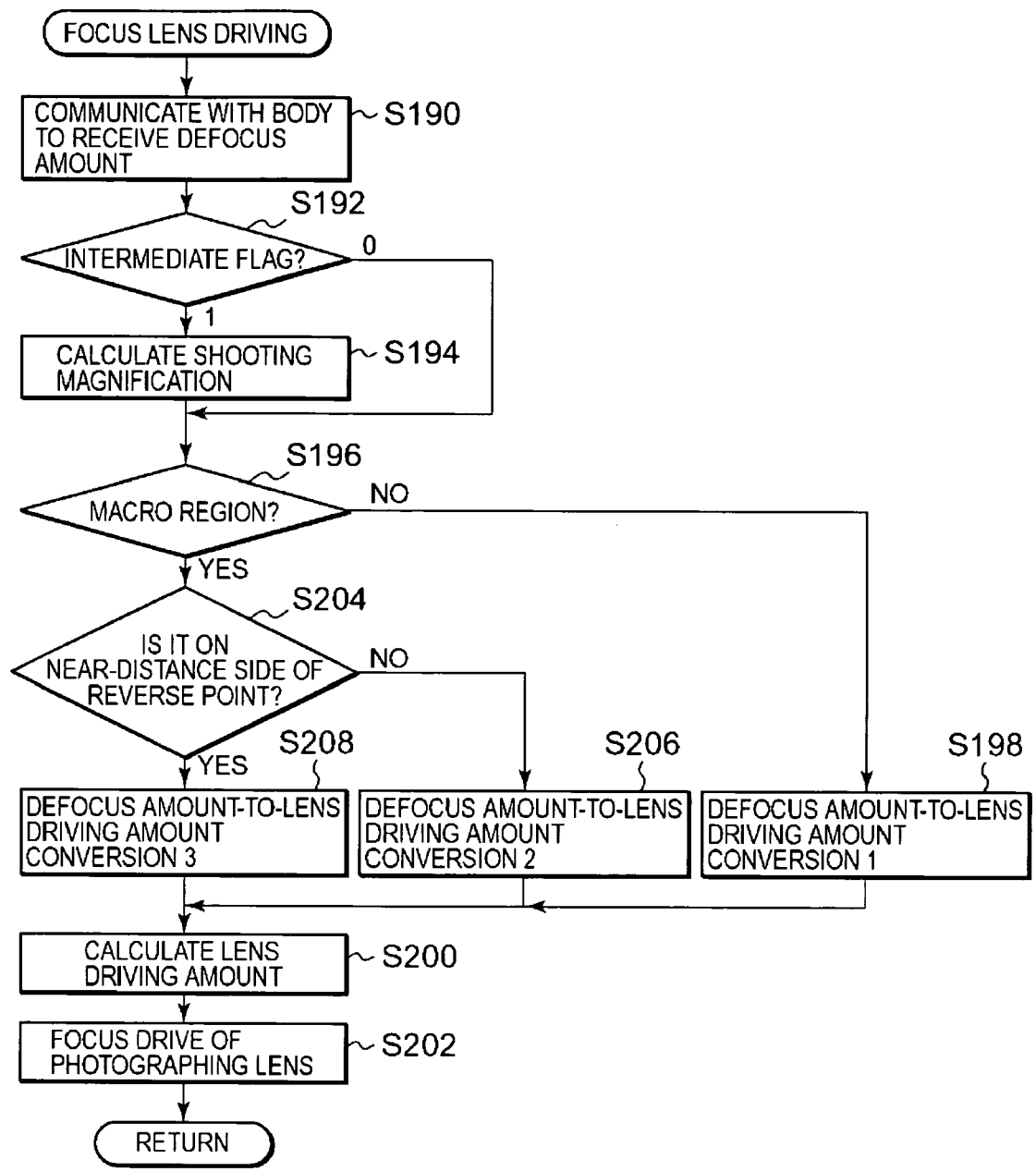
FIG. 15 is a flowchart showing the details of a sub-routine "Focus Lens Driving" executed in FIG. 14 by a L µcom in the lens barrel.

On the other hand, if the lens is not focused yet, a sub-routine "Focus Lens Driving" for driving the focus lens of the lens barrel 14 based on the defocus amount determined as a result of focus detection in step S50 is executed (step S180). This sub-routine "Focus Lens Driving" is executed by the L μcom 36 in the lens barrel 14 in accordance with instructions from the B μcom 38. FIG. 15 is a flowchart showing the details of this sub-routine.

In FIG. 15, the L μcom 36 communicates with the B μcom 38 to receive the defocus amount and the type of intermediate ring 88 read in step S160 in the main flow (step S190).

Then, the intermediate ring flag set in the main flow of FIG. 11 is referred to (step S192). If it is cleared, the procedure shifts to step S196.

On the other hand, if the intermediate ring flag is set, the photographic magnification is calculated (step S194), and then the procedure proceeds to step S196. The magnification calculation is made based on the length of the ring varying depending on the type of intermediate ring 88 and the position of the focus lens read by the encoder included in the lens drive mechanism 18 of the lens barrel 14.

Then, in step S196, it is determined from the photographic magnification whether the focus lens is in a macro region or not. In this case, if the photographic magnification is greater than a predetermined value, it is determined that the focus lens is in a macro region. Note that, if the lens barrel 14 is mounted on the camera body 12 without the intermediate ring 88, it is also determined whether the focus lens is in a macro region in the same manner from the position of the focus lens.

If the focus lens is not in a macro region, the defocus amount-to-lens driving amount conversion 1 is selected (step S198). The defocus amount-to-lens driving amount conversion 1 is the method of converting the defocus amount to the lens driving amount in the non-macro region (region 1) where the focus lens is moved within a region other than the macro region. After that, based on the defocus amount received in step S190 and the defocus amount-to-lens driving amount conversion method selected, the lens driving amount is calculated (step S200) to cause the lens drive mechanism 18 to drive the focus lens based on the lens driving amount calculated (step S202), and the procedure returns to the upper routine.

On the other hand, if the focus lens is in a macro region, reverse-point position data of the focus lens in combination of the intermediate ring 88, which varies depending on the type of intermediate ring 88 mounted (see FIG. 13B), is read from the memory element 94 of the lens barrel 14 to determine whether the current position of the focus lens is located on the near-distance side (region 3) of the reverse point (step S204). If it is not on the near-distance side, that is, if the current position of the focus lens is in the region 2, the defocus amount-to-lens driving amount conversion 2 is selected (step S206). The defocus amount-to-lens driving amount conversion 2 is the method of converting the defocus amount to the lens driving amount in one macro region (region 2) where the focus lens is moved within a macro region that does not correspond to the near-distance side of the reverse point. On the other hand, if the focus lens is located on the near-distance side (region 3), the defocus amount-to-lens driving amount conversion 3 is selected (step S208). The defocus amount-to-lens driving amount conversion 3 is the method of converting the defocus amount to the lens driving amount in the other macro region (region 3) where the focus lens is moved within the macro region corresponding to the near-distance side of the reverse point.

When a defocus amount-to-lens driving amount conversion method is selected in the manner mentioned above, the procedure proceeds to step S200 to calculate the lens driving amount based on the defocus amount-to-lens driving amount conversion method selected and the defocus amount received in step S190. Then, in step S202, the focus lens of the lens barrel 14 is driven based on the lens driving amount calculated.

FIG. 13B is a table showing an example of reverse-point position data stored in the memory element 94 of the lens barrel 14. As shown, plural pieces of reverse-point position data DL1, DL2, . . . , DLn corresponding to the types of mounted intermediate rings 88 1, 2, . . . , n are stored.

The B μcom 38 communicates with the mounted intermediate ring 88 to determine the type of intermediate ring 88. The L μcom 36 reads and uses a corresponding one of the reverse point data selectively from the data group stored in the memory element 94 as shown in FIG. 13B according to the type of intermediate ring 88 determined by the B μcom 38.

Thus, the fourth embodiment can be applied to a lens barrel 14 used in combination of plural kinds of intermediate rings 88.

It is convenient to apply this system to a newly released lens barrel 14 because it can support a new combination of the newly released lens barrel 14 and any of existing intermediate rings 88.

Thus, according to the fourth embodiment using an intermediate ring 88, when the focus lens is located on the near-distance side of the reverse point (point B) stored in the memory element 94 in the lens barrel 14, the method of converting the defocus amount to the lens driving amount is changed to a proper method, thereby enabling proper AF operation. This can improve usability without giving any uncomfortable feeling to the photographer.

Fifth Embodiment

Figures 16A, 16B:
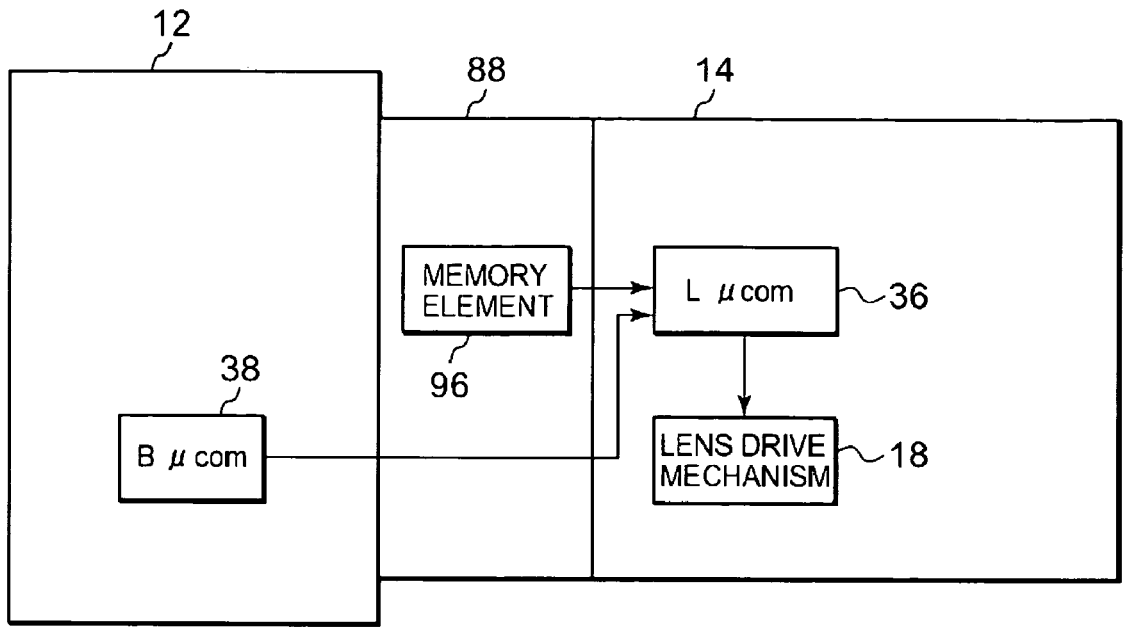
FIG. 16A is a schematic block diagram for explaining the features of a camera having a focusing device according to a fifth embodiment of the present invention.
FIG. 16B is a table showing an example of reverse-point position data stored in a memory element in an intermediate ring.

In the fifth embodiment, position information on reverse points, which is stored in the memory element 94 of the lens barrel 14 in the fourth embodiment, is stored in a memory element (such as an EEPROM) 96 provided in the intermediate ring 88 as shown in FIG. 16A.

In other words, in this embodiment, the B μcom 38 in the camera body 12, the memory element 96 in the intermediate ring 88, and the L μcom 36 in the lens barrel 14 can communicate with one another to exchange commands and data.

The L μcom 36 communicates with the memory element 96 in the intermediate ring 88 to acquire the position information on reverse points prestored in the memory element 96 in the intermediate ring 88. Then, it compares the focus lens position information with a corresponding reverse-point position to control the lens drive mechanism 18. Specifically, when the focus lens is located on the near-distance side of the reverse point (point B), the defocus amount to the lens driving amount is changed to a proper method to perform AF.

The other structural elements of the camera body 12 and the lens barrel 14 are the same as those in the first embodiment (FIG. 1). Further, the main flow is the same as that in the third embodiment (FIG. 11). Therefore, the description of these common portions will be omitted. In addition, the flows of the sub-routine "AF" and the sub-routine "Focus Lens Driving" are the same as those in the fourth embodiment (FIGS. 14 and 15). Therefore, the description of these common portions will also be omitted.

FIG. 16B is a table showing an example of reverse-point position data stored in the memory element 96 of the intermediate ring 88. As shown, plural pieces of reverse-point position data DT1, DT2, . . . , DTn corresponding to the types of lens barrels 14 1, 2, . . . , n, to which the intermediate ring 88 is attached, are stored in the memory element 96.

The L μcom 36 reads and uses a corresponding one of the reverse point data selectively from the data group stored in the memory element 96 in the intermediate ring 88 as shown in FIG. 16B according to the type of lens barrel 14 concerned.

Thus, the fifth embodiment can be applied to an intermediate ring 88 used in combination of plural kinds of lens barrels 14.

It is convenient to apply this system to a newly released intermediate ring 88 because it can support a new combination of the newly released intermediate ring 88 and any of existing lens barrels 14.

Thus, according to the fifth embodiment using an intermediate ring 88, when the focus lens is located on the near-distance side of the reverse point (point B) stored in the memory element 96 in the intermediate ring 88, the method of converting the defocus amount to the lens driving amount is changed to a proper method, thereby enabling proper AF operation. This can improve usability without giving any uncomfortable feeling to the photographer.

Each of the structural elements in the digital camera 10 described in the aforementioned embodiments can also be referred to as follows: the photographing optical system 16 as a photographing lens; the AF sensor 48 as a defocus-amount detection part; the lens drive mechanism 18 not only as a focus-lens position detecting part including an encoder and capable of detecting the position of the focus lens, bus also as a focus-lens moving part for moving the focus lens; the SDRAM 70 in the camera body 12 as a camera memory element; the memory element 94 in the lens barrel 14 as a lens-barrel memory element; the memory element 96 in the intermediate ring 88 as an intermediate-ring memory element; a combination of the AF sensor and the B μcom 38 as a defocus-amount varying direction detecting part because it can detect a defocus-amount varying direction; the lens drive mechanism 18 including the encoder as a detection part because it can detect the position at which the defocus direction is changed; the B μcom 38 as a control part or determination part; a combination of the AF sensor, the B μcom 38, and the lens drive mechanism 18 as a specific-position detection part because it can detect a specific position of the focus lens (e.g., reverse point B); the camera operating SW 82 as a selection part for allowing a user to select various operations; and the LCD control panel 80 and/or the LCD monitor 68 as a display part.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera having a focusing device comprising:
    a photographing lens including a focus lens to form an optical image of a subject;
    a defocus-amount varying direction detecting part which detects the defocus-amount varying direction of the photographing lens;
    a focus-lens moving mechanism which moves the focus lens;
    a focus-lens position detecting part which detects the position of the focus lens;
    a reverse point detection part which detects a reverse point, wherein the reverse point is a position of the focus lens at which a defocus-amount varying direction changes;
    an autofocus determination part which determines whether the position of the focus lens is located on the far-distance side or the near-distance side of the detected reverse point; and
    a control part which moves the focus lens (A) using a first defocus amount-to-lens driving amount relationship when the autofocus determination part determines that the position of the focus lens is located on the far-distance side of the detected reverse point and (B) using a second defocus amount-to-lens driving amount relationship when the autofocus determination part determines that the position of the focus lens is located on the near-distance side of the detected reverse point.

2. The camera according to claim 1 further comprising a memory element for storing the position of the focus lens detected by the focus-lens position detecting part.

3. The camera according to claim 2 wherein the memory element is provided inside the photographing lens.

4. The camera according to claim 1 wherein the defocus amount-to-lens driving amount relationship is an inversion.

* * * * *